(12) United States Patent
Rowley

(10) Patent No.: US 11,538,213 B2
(45) Date of Patent: Dec. 27, 2022

(54) CREATING AND DISTRIBUTING INTERACTIVE ADDRESSABLE VIRTUAL CONTENT

(71) Applicant: LiveCGI, Inc., Westport, CT (US)

(72) Inventor: Marc Rowley, Lake Oswego, OR (US)

(73) Assignee: LIVE CGI, INC., Westport, CT (US)

( * ) Notice: Subject to any disclaimer, the term of this patent is extended or adjusted under 35 U.S.C. 154(b) by 55 days.

(21) Appl. No.: 17/090,664

(22) Filed: Nov. 5, 2020

(65) Prior Publication Data

US 2021/0056750 A1 Feb. 25, 2021

Related U.S. Application Data

(63) Continuation-in-part of application No. 17/033,496, filed on Sep. 25, 2020, which is a continuation of
(Continued)

(51) Int. Cl.
*G06T 15/20* (2011.01)
*G06F 3/04815* (2022.01)
(Continued)

(52) U.S. Cl.
CPC ............ *G06T 15/205* (2013.01); *G06F 3/012* (2013.01); *G06F 3/013* (2013.01); *G06F 3/016* (2013.01);
(Continued)

(58) Field of Classification Search
CPC ....... G06T 15/205; G06T 17/00; G06T 19/00; G06T 19/20; G06T 2207/30196; G06T 2207/30221; G06T 2215/16; G06T 2219/024; G06T 5/002; G06T 7/292; G06T 7/73; H04N 5/247; G06F 3/012;
(Continued)

(56) References Cited

U.S. PATENT DOCUMENTS 6,567,116 B1  5/2003  Aman
10,789,764 B2  9/2020  Rowley
(Continued)

OTHER PUBLICATIONS

U.S. Appl. No. 62/452,694, filed Jan. 31, 2017.
U.S. Appl. No. 17/033,496, Non-Final Office Action dated Sep. 20, 2021, 55 pages.

*Primary Examiner* — Sing-Wai Wu
(74) *Attorney, Agent, or Firm* — Lathrop GPM LLP

(57) ABSTRACT

Systems and methods create and distribute addressable virtual content with interactivity. The virtual content may depict a live event and may be customized for each individual user based on dynamic characteristics (e.g., habits, preferences, etc.) of the user that are captured during user interaction with the virtual content. The virtual content is generated with low latency between the actual event and the live content that allows the user to interactively participate in actions related to the live event. The virtual content may represent a studio with multiple display screens that each show different live content (of the same or different live events), and may also include graphic displays that include related data such as statistics corresponding to the live event, athletes at the event, and so on. The content of the display screens and graphics may be automatically selected based on the dynamic characteristics of the user.

16 Claims, 16 Drawing Sheets

Related U.S. Application Data application No. 15/994,840, filed on May 31, 2018, now Pat. No. 10,789,764.

(60) Provisional application No. 62/513,198, filed on May 31, 2017.

(51) Int. Cl.
| | | |
|---|---|---|
| *G06T 17/00* | (2006.01) | |
| *G06T 19/00* | (2011.01) | |
| *G06T 19/20* | (2011.01) | |
| *H04N 5/222* | (2006.01) | |
| *H04N 21/2187* | (2011.01) | |
| *G06T 7/73* | (2017.01) | |
| *G06T 5/00* | (2006.01) | |
| *G06F 3/01* | (2006.01) | |
| *G06F 3/16* | (2006.01) | |
| *G06T 7/292* | (2017.01) | |
| *H04N 5/247* | (2006.01) | |

(52) U.S. Cl.
CPC .......... *G06F 3/04815* (2013.01); *G06F 3/165* (2013.01); *G06T 5/002* (2013.01); *G06T 7/292* (2017.01); *G06T 7/73* (2017.01); *G06T 17/00* (2013.01); *G06T 19/00* (2013.01); *G06T 19/20* (2013.01); *G06F 3/16* (2013.01); *G06T 2207/30196* (2013.01); *G06T 2207/30221* (2013.01); *G06T 2215/16* (2013.01); *G06T 2219/024* (2013.01); *H04N 5/247* (2013.01)

(58) Field of Classification Search
CPC ...... G06F 3/013; G06F 3/016; G06F 3/04815; G06F 3/16; G06F 3/165
See application file for complete search history.

(56) References Cited

U.S. PATENT DOCUMENTS

| | | | |
|---|---|---|---|
| 2007/0239611 A1* | 10/2007 | Blum | ............... G06F 16/68 705/51 |
| 2010/0026809 A1 | 2/2010 | Curry | |
| 2013/0147785 A1 | 6/2013 | Patiejunas | |
| 2013/0249948 A1* | 9/2013 | Reitan | ............ G06F 3/04815 345/633 |
| 2014/0223313 A1* | 8/2014 | Aebi | ............... G06F 9/451 715/733 |
| 2017/0173466 A1 | 6/2017 | Fahmie | |
| 2017/0178298 A1 | 6/2017 | Bonnier | |
| 2017/0318262 A1* | 11/2017 | Safaei | ............ H04N 7/0127 |
| 2017/0359523 A1 | 12/2017 | Rubinstein | |
| 2018/0133603 A1* | 5/2018 | Ninoles | ......... H04N 21/43074 |
| 2018/0220125 A1 | 8/2018 | Tamir | |

\* cited by examiner

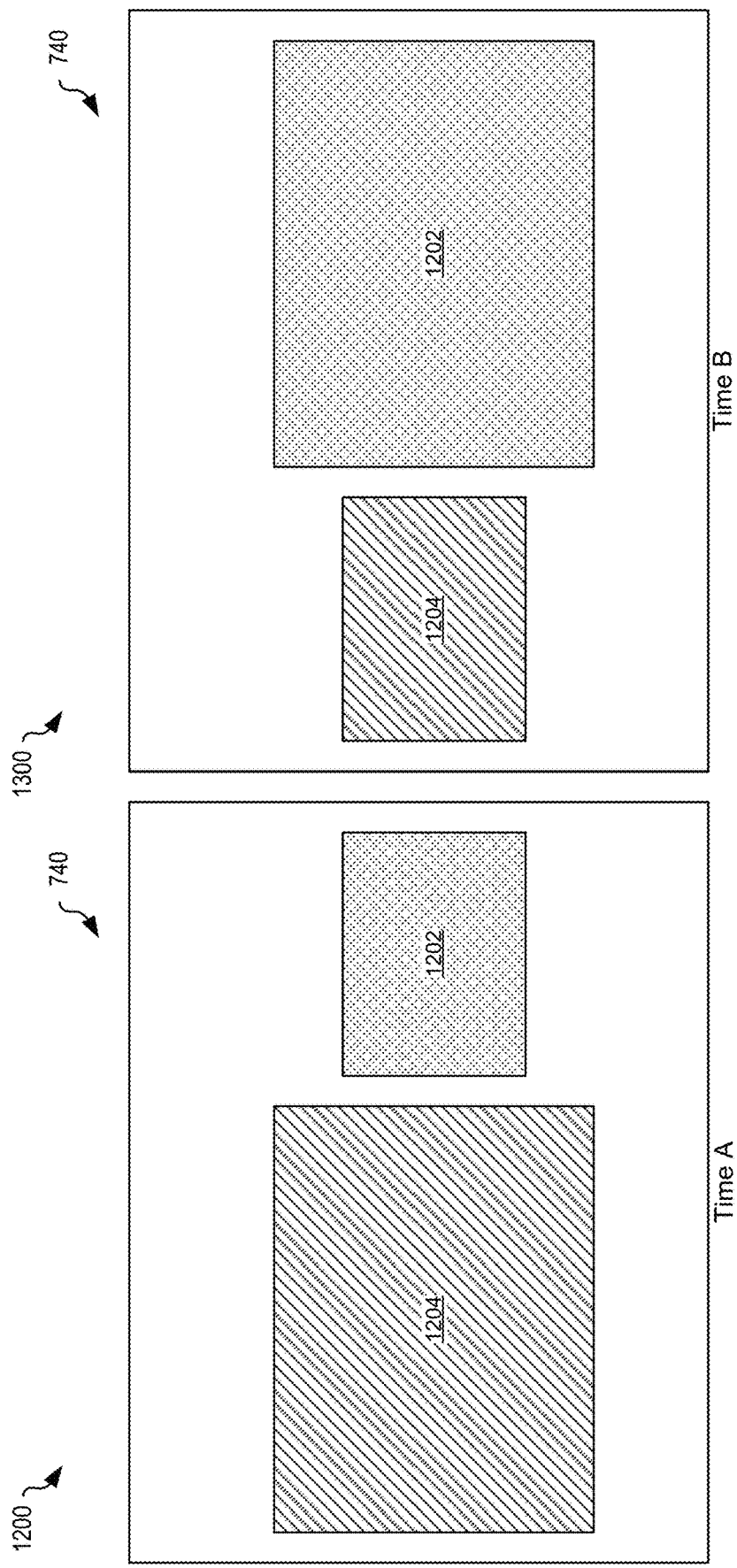

CREATING AND DISTRIBUTING INTERACTIVE ADDRESSABLE VIRTUAL CONTENT

RELATED APPLICATIONS

This application is a continuation-in-part of U.S. application Ser. No. 17/033,496, titled "Systems and Associated Methods for Creating a Viewing Experience", filed Sep. 25, 2020, which is a continuation of U.S. patent application Ser. No. 15/994,840, filed Jan. 1, 2018, which claims priority to U.S. patent application Ser. No. 62/513,198, filed May 31, 2017. Each of the above referenced applications are incorporated herein by reference in their entirety.

BACKGROUND

Media companies, education entities, gambling proprietors and government organizations have historically broadcast live content in a variety of contexts, including news, entertainment, sports, education, documentaries, dramas, weather, and so forth. The nature of live broadcasts continually changes with newly developed technology, including wireless broadcast, video broadcast, and internet streaming. As the internet has become more accessible, media companies have transitioned to streaming live and on demand content to consumers over the internet. In some situations, one or more media companies may broadcast the same event using different broadcast mechanisms, such as cable television, internet streaming, and as content (e.g., a concert) within a videogame.

Gaming and associated betting has increased in popularity and competitiveness. Livestreams of video game events (e.g., Fortnite concerts) and video game competitions (e.g., thee International, an annual esports world championship tournament for the video game Dota 2, which is hosted and produced by the game's developer, Valve) have increased in popularity, with millions of people participating in the largest of these events. These events attract commentary, betting, and, analysis, including one or more of news commentary, sports analysis commentary, betting lines on the competition, interviews with competitors, interviews with coaches, interviews with experts, and so on.

SUMMARY

Media transmission, including television, cable, satellite, and internet, occurs with a delay of at least 2 seconds, and at times more than 40 seconds, resulting in a delay between when the event occurs and when the consumer watches the event. Causes of this delay include processing of media, data transmission, data compression and expansion, data formatting, other processing of data, and combinations thereof. Delayed broadcasting results in many challenges, including spoilers for live events communicated over other, faster transmitting, media (e.g., text messaging), remote live commentary and discussion, an inability to perform betting activities due to limiting of in-event transactions at realtime, and so forth.

Furthermore, live media streams, such as news, sports, and other broadcasts, are often recorded in professional physical studios invested with millions of dollars of infrastructure and/or in studios with LED panels that create scene visuals, including equipment, props, backgrounds, and furniture. This makes professional broadcasts expensive to set up and produce. Moreover, where many employees may work from home, or where members of an organization are located at different geographic locations, such infrastructure becomes inflexible and prohibitively expensive.

In addition, conventional virtual streaming platforms are inflexible and complicated to operate, because a producer may encode live media into a first input pipeline, graphics into a second pipeline, and a commentator into a third pipeline. The producer then manually compiles the pipelines into a single broadcast. However, changing any of the streams, or adding a new one, is often impossible or involves substantial production time, thus reducing the flexibility of more expensive platform.

Although content creators have large amounts of data and metadata pertaining to the elements of a production, the location, the actors, the participants, the materials, the commentary, the background, the clothing, the articles, and everything that is composited in the content, current systems and methods limit sending and sharing of this information to/with the viewing public due to differences in how content is presented (e.g., in theaters, on TV's, on smartphones and other devices). This inability to deliver metadata limits user interactivity and reduces the ability of content creators to monetize their product.

Most video streaming and video production culminates in single images flashing at a frame rate of 24, 29, 30, 50, or 60+ frames per second to present moving images to a user. However, generation of such content requires transmission of the entire scene (image) each time, thereby redrawing elements that do not need to be re-drawn, and is therefore inefficient.

Further, to make revenue for the creators, most streaming sites mandate pre-rolling of videos (e.g., advertisements, paid content, etc.), which takes consumers away from the content they want to see until they are released from the pre-rolled video after a timed duration or when it ends. Embodiments herein provide an alternative approach where content creators customize content delivery by associating content that plays alongside the desired content, creating a symbiotic relationship between consumer and consumed content.

In the prior art, advertising is also transmitted/embedded within the content and forces any customization of the advertising to require an overlay or a pixel replacement process (e.g., like replacing the green screen behind the batters made popular by SportVision/SportsMedia Technology), where advertising is inserted into a content stream, or requires multiple streams where multiple advertising paths or content paths are used. This replacement approach impedes advertisers reaching audiences with custom content, since individual streams with individual placements are required, and customizing replacement are required down the line. A one to many approach with placements from server nodes is not possible in the prior art.

As a result of the increased prevalence of online streaming content, there is a need for a user-friendly production platform that is easily modified with input from different formats, including video, livestream, and so on. Furthermore, there is a need for low-latency livestream broadcasting. Furthermore, there is a need for a system where content may be distributed as a single feed that may be split into multiple feeds without requiring additional bandwidth. There is also a need for systems and methods where advertising, messaging, and commerce (bets/transactions) occur inside the content experience such that the consumer is not required to leave their desired experience to make a transaction and/or to view custom content.

The embodiments herein describe systems and methods for creating and distributing low-latency interactive addressable virtual content, where the virtual content depicts a live event that is customized to address each individual user based on interaction with that user. The virtual content is dynamically generated from a live event and customizable to meet a user's needs and habits. Further, the embodiments disclosed herein allow the user to interact with the virtual content by facilitating communication channel to a third party associated with the virtual content. The embodiments disclosed herein also make the virtual content addressable whereby at least one third party may target specific users with preferred content.

BRIEF DESCRIPTION OF THE FIGURES

FIG. 12 shows one example screenshot of the live content of FIG. 7 at a first time (time A), in embodiments.

FIG. 13 shows one example screenshot of the live content of FIG. 7 at a second time (time B), later than the first time of FIG. 12, in embodiments.

DETAILED DESCRIPTION OF THE EMBODIMENTS

The embodiments disclosed herein include systems and methods for generation and streaming of live content (e.g., digital content, digital feed, feed, etc.), where the generation includes high production flexibility with low latency between capture of a live event and output of the live content. For example, embodiments disclosed herein achieve a latency of less than one second. The embodiments disclosed herein further represent a novel approach towards content generation, distribution, and customization. One main feed is created, and from that main feed, a plurality of customized feeds is derived. These customized feeds appear as if multiple feeds are being generated, but with a significantly reduced bandwidth as compared to the bandwidth required for multiple feeds. This customized content approach unlocks user (viewer) interactivity by allowing for transactions (betting, purchases, etc.) in real-time within the customized live content. The following examples use a virtual newsroom for a live online gaming event to illustrate the principals of operation of the systems and methods; however, the embodiments herein may apply to broadcasting any live event, including artistic performances, sports, online gaming, and so on.

Figure 1:
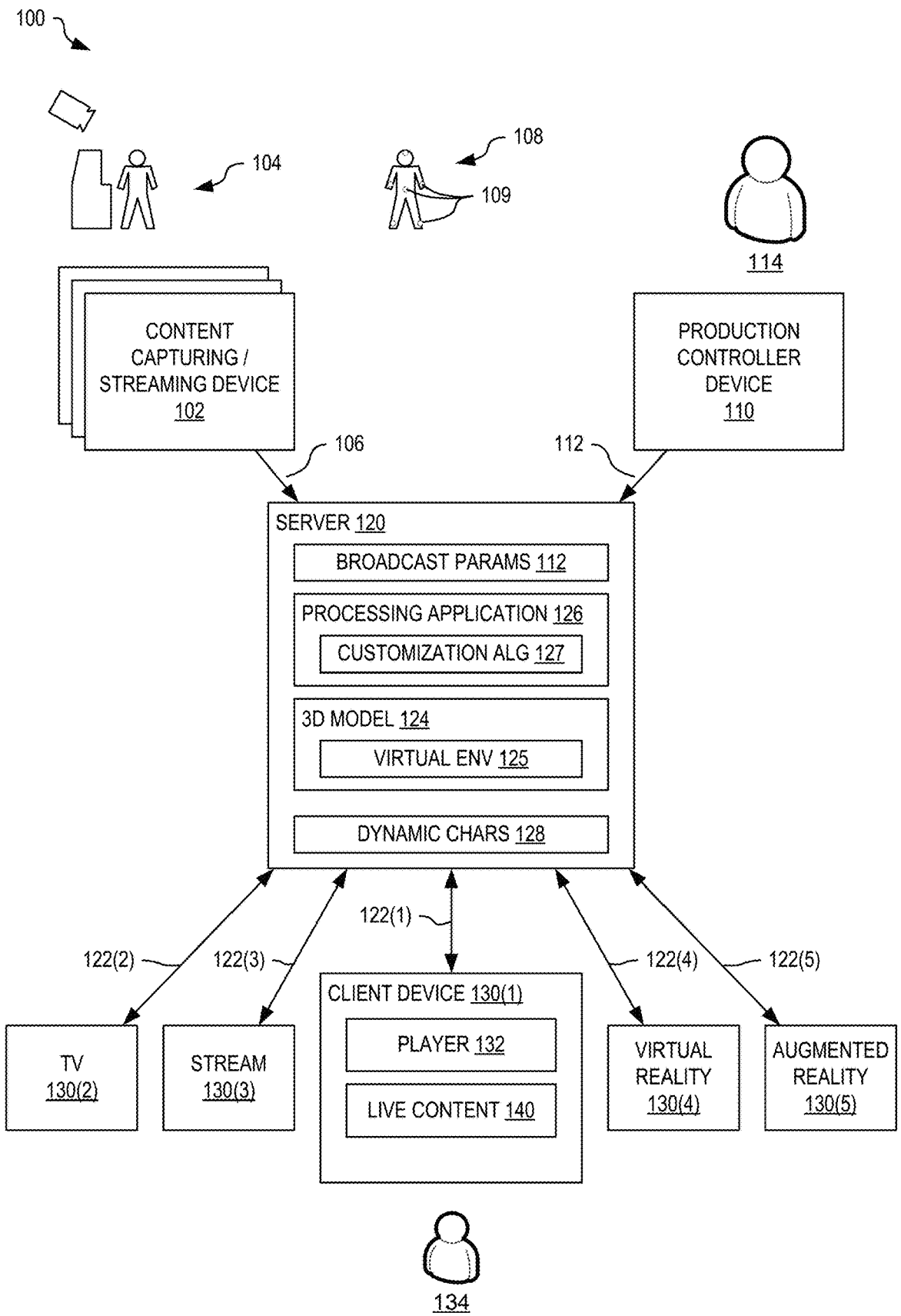
FIG. 1 shows one example system for generating live content of a virtual environment for display on client devices, in embodiments.

FIG. 1 shows one example system 100 for generating live content 140 of a virtual environment for display on client devices 130. Live content 140 contains, at least in part, real-time video content that is rendered within the virtual environment. System 100 includes a server 120 that runs a processing application 126 (for video, computer generated images and volumetric experiences) that receives media streams 106, including image data, and metadata for generating environments, using a network device interface (NDI) protocol for example or a real time messaging protocol (RTMP), from at least one content capturing/streaming device 102, broadcast parameters 112 from a production controller device 110, and generates a live broadcast 122 that produces live content 140 on at least one client device 130. In certain embodiments, server 120 is implemented as a cloud-based service. Media streams 106 may be generated as one or more of a live video stream, an interne source (e.g., Twitch, YouTube), a video stream from a standard camera source, a video retrieved from local memory, video data retrieved from AR/VR camera sources, and so on.

Processing application 126 may generate a customized live broadcast 122 for each connected client device 130 without needing additional streams. As shown in FIG. 1, live broadcast 122(1) is output to client device 130(1), which may represent a mobile device, live broadcast 122(2) is output to client device 130(2), which may represent a television and/or an LED screen, live broadcast 122(3) is output to client device 130(3), which may represent a gaming console, a volumetric display, and/or multiple screens of a visual environment, live broadcast 122(4) is output to client device 130(4), which may represent a virtual reality player, and live broadcast 122(5) is output to client device 130(5), which may represent an augmented reality player. Processing application 126 generates and updates a 3D model 124 defining a virtual environment 125 in real-time and renders 3D model 124 to generate live broadcast 122 with low-latency and to facilitate live experiences in multiple formats, providing users (e.g., user 134) with a more in-depth experience, independent of their platform. In certain embodiments, processing application 126 may receive utilize sensor data from client device 130 to facilitate control of the virtual experience, and live content 140 may be considered a live data experience.

Media streams 106 may conform to the NDI protocol or the RTMP, or may be converted to the NDI protocol or the RTMP, or any other signaling protocol, by processing application 126 within server 120. Particularly, latency between a live event 104 captured by content capturing/streaming device 102 and output of live content 140 on client device 130 is less than one second and thus a user 134 of client device 130 experiences live event 104 with minimal delay (e.g., essentially in real-time). Live event 104 may have a start time and an end time, and system 100 operates to provide enjoyment, instruction, recovery, or any other experience that is designed for humans or artificial intelligence to visually, audibly, physical or mentally process. Client device 130 may represent one or more of a mobile device, a smartphone, a tablet, a laptop computer, a desktop computer, a smart TV, a TV box (e.g., Apple TV), a smart watch, any other electronic device, and combinations thereof.

Content capturing/streaming devices 102 send media streams 106 including 2D, 3D and volumetric content to server 120 and may represent one or more of: a video camera, a microphone, a motion capture device, a game capture device, and so on. For example, content capturing/streaming device 102 may capture one or more of: audio, video, screen captures, motion capture information (e.g., from motion sensors on a person, animal, object, etc.), augmented reality ("AR") recording, virtual reality ("VR") recording, and combinations thereof. Multiple content capturing/streaming devices 102 may be used to capture the same live event 104, each one providing different media streams 106 to processing application 126. For example, a first content capturing/streaming device 102 may capture a game feed (e.g., digital content of a game being played by a gamer), and a second content capturing/streaming device 102 may be a video camera capturing video of the gamer playing the game. For example, content capturing/streaming device 102 may provide a Twitch® video stream, such as a Twitch stream of a video game during play, as media stream 106. In another example, content capturing/streaming devices 102 may capture a YouTube® channel. In another example, content capturing/streaming devices 102 may record motion captured from one or more motion sensors attached to an actor or performer. As used herein, a 3D model defines points and surfaces in three dimensions, and with relation to other points and surfaces in the 3D model. Thus, the 3D model may be considered to have an inside-out perspective, where items are related within. Volumetric content, on the other hand, may be considered to have an outside-in perspective, since the features of the volumetric content are defined by external references. For example, a 3D model received from an iPhone using SLAM, defines where it is, where it is going, and what it is doing, but only in the context of itself. Such a 3D model requires a volumetric model to relate the relative motion of the 3D model components to the external world (e.g., the universe of things). A volumetric model defines an object from the outside looking at the object and defining where the object is headed, however the volumetric model does not define the future location of the object. A 3D model may be created from a volumetric model; however, a 3D model cannot be created from a volumetric model. When used together, the volumetric model and the 3D model may provide a high degree of accuracy in the realm of spatial computing, such as for AR/VR and MR experiences. Thus, while FIG. 1 shows an example in which a 3D model (e.g., 3D model 124) is generated and rendered for a virtual environment (e.g., virtual environment 125), it will be understood that features and functionality discussed in connection with the 3D model 124 may similarly apply, in many instances, to a volumetric model and/or a combination of a 3D model and volumetric model.

FIG. 1 shows example flow of data during generation of live content 140. Content capturing/streaming devices 102 capture and send media streams 106 to server 120. In certain embodiments, content capturing/streaming device 102 may represent another server or service, such as a Twitch, whereby processing application 126 retrieves media stream 106 via the Internet (e.g., a website) from that server or service. Processing application 126 may convert media stream 106 (e.g., using a player such as VLC) into use the NDI protocol or RTMP. Processing application 126 may then use each media stream 106 as a source for different content channels (see virtual channels 214 of FIG. 2) within virtual environment 125 of 3D model 124. In one example, where at least one media stream 106 includes volumetric data of event 104, processing application 126 may generate 3D model 124 based on the received volumetric data. In another example, processing application 126 may select 3D model 124 from a plurality of previously defined 3D models of volumetric spaces (described in detail below). Processing application 126 generates live broadcast 122 from 3D model 124 and live broadcast 122 may include video and audio of virtual environment 125. The broadcast may also be recorded media. Accordingly, content may be displayed in sync, or non-synchronous, to a live event.

Client device 130 may send dynamic characteristics 128 (e.g., feedback on viewing, preferences, and interactive habits of user 134) to server 120, via a communication path of live broadcast 122 (which may be two-way digital communication) or via other communication paths (not shown). In certain embodiments, processing application 126 may determine dynamic characteristics 128 based on content selection feedback, content switching, and other inputs received from client device 130. Processing application 126 may include a customization algorithm 127 that customizes content of live broadcast 122 based upon the dynamic characteristics 128 such that each live broadcast 122 is individually customized for the corresponding client device 130.

Customization algorithm 127 may implement a weighted calculator that automatically selects media streams 106 for inclusion within 3D model 124 based upon dynamic characteristics 128. For example, where user 134 is affiliated with a particular sports team, customization algorithm, 127 may select media streams 106 that correspond to one or more of the sports team, individual players of the sports team, and statistical information of the sports team or players, such that live broadcast 122(1) output to client device 130(1) of user 134. The weighted calculator selects content desired by user 734 and thereby further encourage user 734 to create transactions based on the desired content. Advantageously, user 134 receives customized content based upon learned habits and preferences of user 134.

Figure 16:
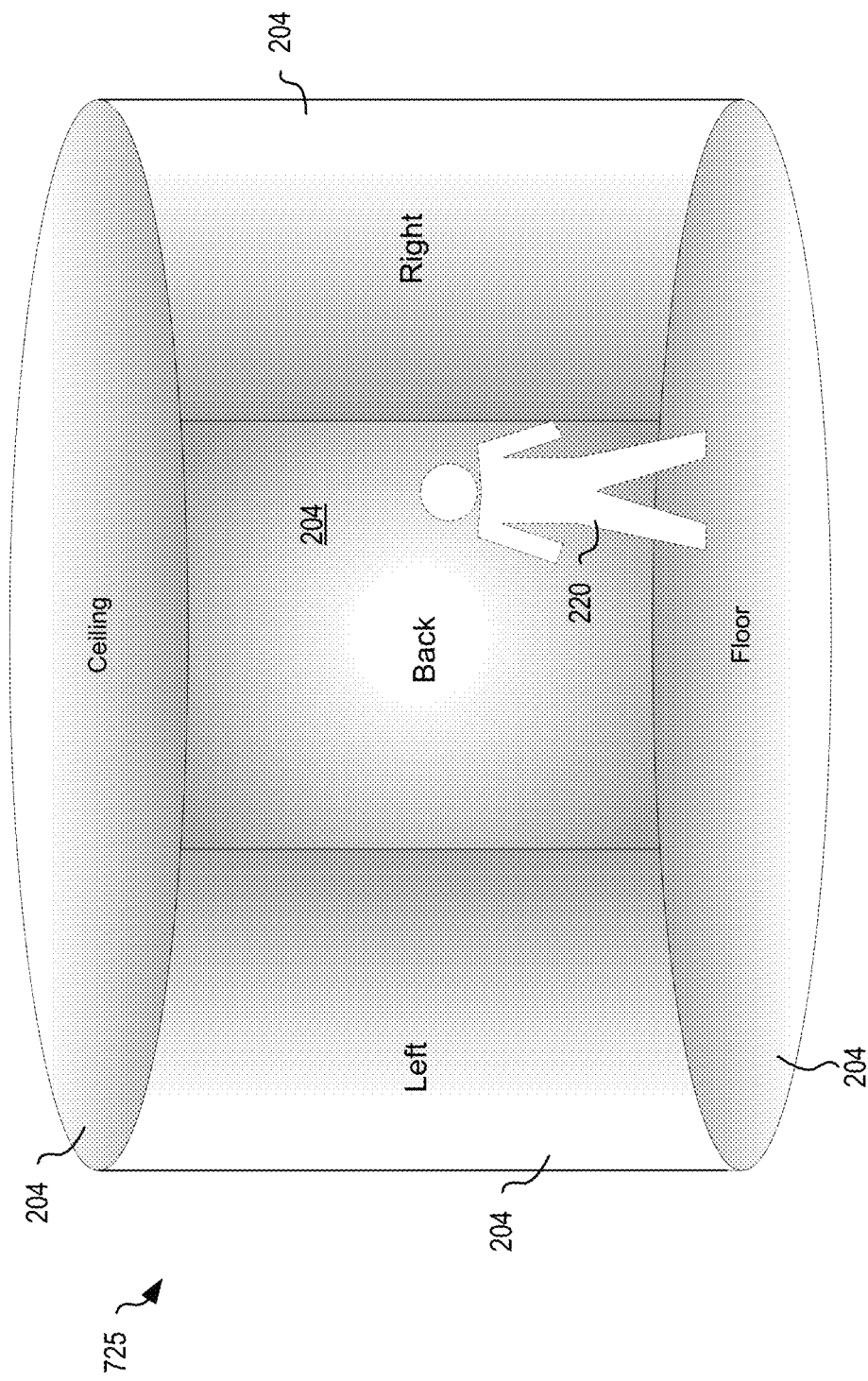
FIG. 16 is a schematic illustrating one example generic virtual environment with surrounding display screens generated from the 3D model of the server of FIG. 7, in embodiments.

A production controller 114 (e.g., a person controlling the production, a production manager, a producer) may use production controller device 110 to define broadcast parameters 112 that control operation of processing application 126 to generate a 3D model 124 of a virtual environment 125 that is output as live broadcast 122. In certain embodiments, processing application 126 renders 3D model 124 to create an example of virtual environment 125 (e.g., see example in FIG. 2) for output as live broadcast 122. Virtual environment may include virtual screens (e.g., display screens 204, FIG. 2, and volumetric spaces that may include LED panel displays and so on, as shown in the example of FIG. 16), and processing application 126 adds media stream 106 to 3D model 124 such that virtual environment 125 is rendered to include the media stream 106 appears on the virtual screen within live broadcast 122. In certain embodiments, processing application 126 implements Unreal® engine or other graphics system to render 3D model 124 to generate displays and graphical visuals of virtual environment 125. Although the following examples show virtual environment 125 as a virtual newsroom, 3D model 124 may define any virtual space where it is advantageous to display multiple video feeds from multiple sources, such as one or more of a virtual newsroom, a virtual classroom, a virtual conference room, a virtual sports studio, a virtual stage, a sports court, a poker table, a studio LED wall or enclose, a virtual dungeon, and other types of environment. 3D model 124 may define a base environment (e.g., largely inanimate objects, including floors, walls, ceilings, furniture, stage, etc.) of the virtual newsroom and/or virtual arena. Broadcast parameters 112 may define how each media stream 106 is used with 3D model 124 to generate live broadcast 122. For example, broadcast parameters 112 may instruct processing application 126 to position media stream 106 in a virtual embedded video screen of 3D model 124 such that live broadcast 122 shows media stream 106 as if being played by the virtual embedded display screen of the virtual newsroom and/or virtual arena in live broadcast 122. Broadcast parameters 112 may also define that media stream 106 includes motion data for controlling an avatar within 3D model 124, such that live broadcast 122 shows the avatar within the virtual newsroom and/or virtual arena (see FIG. 2, described below). Broadcast parameters 112 may also define a virtual camera position (origin) relative to 3D model 124 and/or virtual zoom for the virtual camera such that live broadcast 122 includes 3D model 124 from a desired perspective. Broadcast parameters 112 may also define lighting of 3D model 124, and so on.

Virtual Graphical User Interface (GUI)

Figure 2:
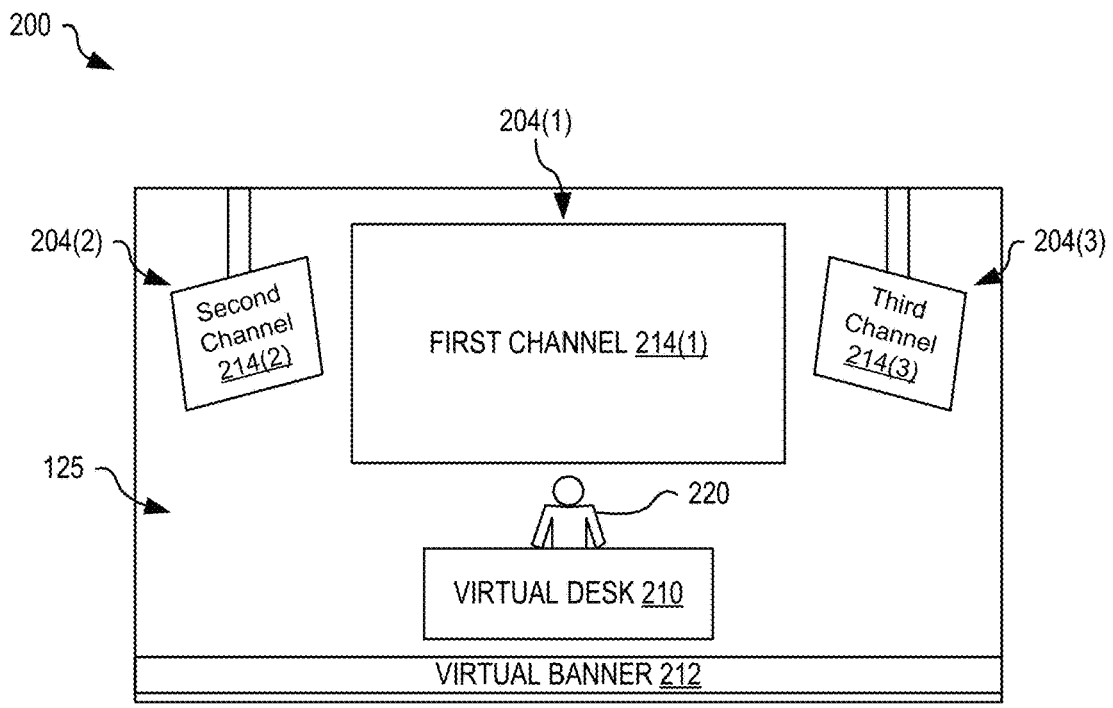
FIG. 2 shows one example 2D first perspective view of the virtual environment of FIG. 1, in embodiments.

FIG. 2 shows one example 2D first perspective view 200 of virtual environment 125, as seen in live broadcast 122. 3D model 124 defines virtual environment 125 that may include one or more virtual screens and other virtual objects. In the example of FIG. 2, virtual environment 125 include a first display screen 204(1), a second display screen 204(2), a third display screen 204(3), and a virtual desk 210. Particularly, first display screen 204(1), second display screen 204(2), and third display screen 204(3) define surfaces that form a first virtual channel 214(1), a second virtual channel 214(2), and a third virtual channel 214(3), respectively, for display of images and/or video from one or more of media streams 106. For example, first display screen 204(1), second display screen 204(2), and third display screen 204(3) may appear, within live broadcast 122, like displays and monitors of a real television studio, where each one shows as corresponding image and/or video. 3D model 124 may define other components within virtual environment 125, such as virtual desk 210 and/or other virtual structure to make virtual environment 125 appear more realistic to user 134. In certain embodiments, 3D model 124 also defines a virtual banner 212 that may be positioned within virtual environment 125. In an alternative embodiment, virtual banner 212 may be added to live broadcast 122 after rendering of virtual environment 125 from 3D model 124. Although three display screens 204 and three corresponding virtual channels 214 are show, system 100 may use more or fewer screens and channels without departing from the scope hereof. System 100 may also use 3D models as textures to have displays render on top, within, and/or in part.

3D model 124 may also include an avatar 220 that may be controlled from movements captured from an actor 108 (FIG. 1) and included within media streams 106. Actor 108 may represent one or more of a newscaster/guest that is hosting a sports show, a performer of a show, an interviewer, and so on. In certain embodiments, movements of actor 108 are captured by one or more sensors 109 (e.g., accelerometers, gyroscopes, visual tracker, etc.) as at least part of media stream 106 and sent to server 120. Broadcast parameters 112 may then define media stream 106 as a control for avatar 220, such that avatar 220 is animated from media stream 106 in real-time, and live broadcast 122 shows avatar 220 following movements of actor 108 substantially in real-time. 3D model 124 may include multiple avatars 220, each controlled from different media streams 106 captured from different actors 108. The multiple avatars 220 may appear to interact directly with one another within live broadcast 122 when the multiple actors 108 may be remotely located from each other. In another example, avatar 220 may be replaced by, and/or generated from, a video feed of an individual positioned in front of a greenscreen, wherein the video feed allows the image of the individual to be included within the 3D model 124 and/or the live broadcast 122. Accordingly, the individual appears within virtual environment 125 when viewed by user 134 on client device 130. In another example where one or more of first virtual channel 214(1), second virtual channel 214(2), and third virtual channel 214(3) are live, people in each channel may communicate in real time. For example, where avatar 220 represent a newscaster and third virtual channel 214(3) includes a commentator, the newscaster may ask the commentator questions, and the commentator may answer in real time. In this manner, virtual environment 125 may replace a physical newsroom, and the newscaster and the commentator may be at different locations.

Broadcast parameters 112 may also assign one media stream 106 to each of first virtual channel 214(1), second virtual channel 214(2), and third virtual channel 214(3). For example, where three different video feeds are provided to server 120 as media streams 106, production controller 114 may set broadcast parameters 112 to assign the different media streams 106 to each of first virtual channel 214(1), second virtual channel 214(2), and third virtual channel 214(3). For example, each channel may correspond to one of a plurality of nodes (similar to nodes 1038/1062 of FIG. 10) that is filled when customization algorithm 127 assigns one of media streams 106 to each node based on dynamic characteristics 128 of user 134, thereby causing the media stream content to display on the corresponding virtual screen in live content 140. The use of nodes makes the virtual content addressable, such that it may be targeted to specific user characteristics. Accordingly, within 3D model 124, processing application 126 renders the video feeds on the corresponding surfaces defined by the first virtual channel 214(1), second virtual channel 214(2), and third virtual channel 214(3). In one example of operation, first virtual channel 214(1) may be a video stream from the Internet, such as a Twitch stream of a Dota 2 championship game. Continuing with the example of FIG. 2, the Twitch stream of the Dota 2 championship game is output as first virtual channel 214(1), and avatar 220 represents an individual or announcer reporting on the championship game. Further, second virtual channel 214(2) may display, based upon preferences defined within dynamic characteristics 128 of user 134, a video of a competitor's live feed or a player's face, and third virtual channel 214(3) may display live commentary from another commentator. Advantageously, the virtual environment 125 presents a live newsroom, with a host (avatar 220) and content related to the championship game, and that is customized based upon preferences and habits of user 134 defined within dynamic characteristics 128.

In certain embodiments, processing application 126 renders at least one 2D image from the 3D model to form live broadcast 122 that may be distributed to client device 130 for display as live content 140 to user 134. In other embodiments, rendering occurs at client device 130. However, the use of broadcast parameters 112 allows production controller 114 to control, through production controller device 110, live broadcast 122 and live content 140. More particularly, broadcast parameters 112 may further define one or more of a visual layout of 3D model 124 that defines virtual environment 125, and a virtual camera origin that defines the view to be displayed of virtual environment 125. Client device 130 may include a content player 132 for receiving and displaying live broadcast 122 on client device 130. For example, content player 132 may play, in real time, video and audio received within live broadcast 122.

Although advantageous for displaying live content from multiple sources, system 100 also allows production controller 114 to configure broadcast parameters 112 for display of non-live content. One or more of first virtual channel 214(1), second virtual channel 214(2), and third virtual channel 214(3) may be controlled to show pre-recorded content. For example, first virtual channel 214(1) may represent a video feed with highlights of a championship game, and second virtual channel 214(2) and/or third virtual channel 214(3) may show analysis of that highlight, views from different perspectives of the same highlights, other commentators, and so on. In certain embodiments, virtual environment 125 may include virtual banner 212, which may be displayed in any format or location and that includes any one or more of news information, advertisements, summaries, updates, or other pertinent information. As shown in FIG. 2, virtual banner 212 may be statically positioned as an overlay onto live broadcast 122. Alternatively, virtual banner 212 may be integrated within virtual environment 125 in a subtle way, such as appearing as a poster in the background of the simulated studio, or as any one or more other decorative features within virtual environment 125.

In some embodiments, virtual environment 125 may be changed based on the content being displayed and reported on. For example, the virtual environment may have a first design when used to report on an online game (e.g., a Fortnite competition), and a second design when broadcasting a basketball game. Advantageously, since virtual environment 125 is not real, the amount of capital and physical space required to host one or more broadcasts is reduced, and is very flexible.

Figure 3:
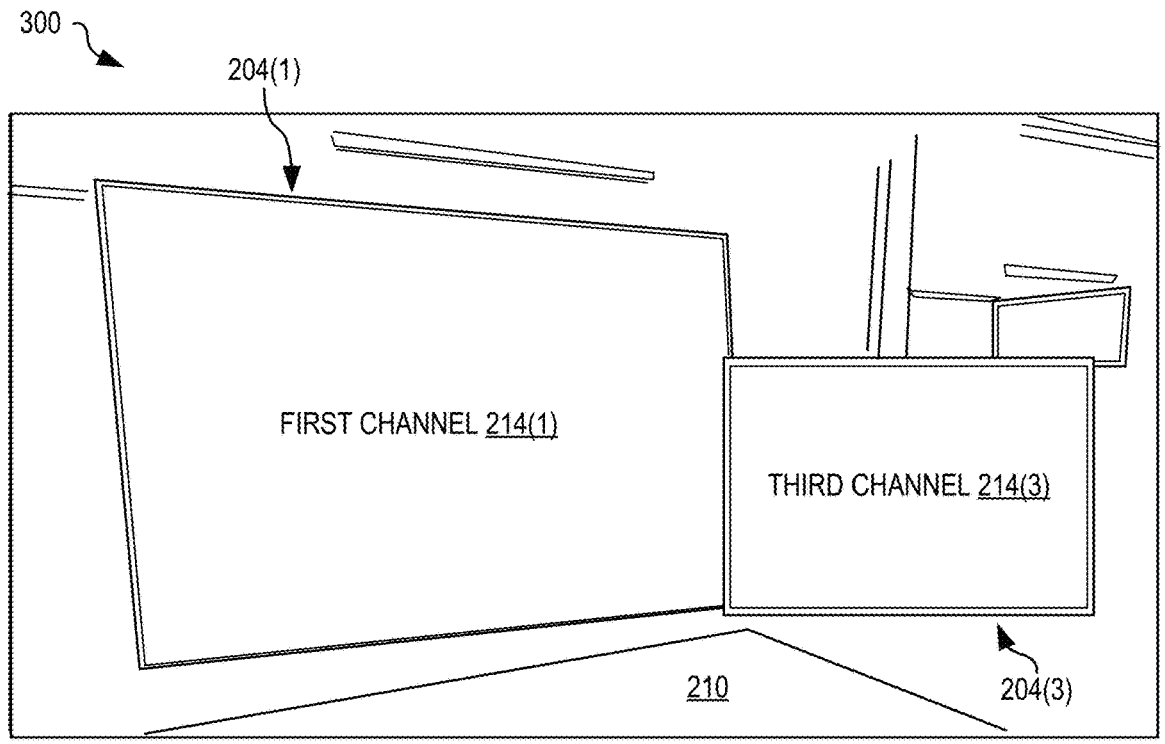
FIG. 3 shows one example screenshot from the live content of FIG. 1, where actions of the user select a different viewing perspective of the virtual environment, in embodiments.

FIG. 3 shows one example screenshot 300 from live content 140 of FIG. 1, where actions of user 134 select a different viewing perspective of virtual environment 125 as compared to the first perspective view of FIG. 2. For example, when user 134 moves his or her gaze to view third virtual channel 214(3), or otherwise interactively selects third virtual channel 214(3), the virtual camera position (origin and/or orientation) relative to 3D model 124 and/or virtual zoom changes such that the virtual camera (used to render 3D model 124) makes third display screen 204(3) orthogonal to the viewing direction. As shown in FIG. 3, the magnification of third virtual channel 214(3) is uniform such that images from third virtual channel 214(3) fill third display screen 204(3) and appear flat to user 134. On the other hand, the magnification of first virtual channel 214(1) becomes non-uniform such that images of first virtual channel 214(1) are within first display screen 204(1) that appears to be turned away from user 134. Specifically, this makes first display screen 204(1) appears to user 134 to be displayed at a tilt. When first virtual channel 214(1) is live streaming, the magnification changes occur in real-time, and the illusion of virtual environment 125 appearing to be a real studio is maintained. Other characteristics (e.g., resolution, brightness, contrast, etc.) of live content 140 may also change to render 3D model 124 to realistically show virtual environment 125 as appearing to be real.

Real-Time Control

Control of a conventional live broadcasts is complex, requiring a production team of many people to monitor and adjust numerous parameters. One aspect of the present embodiments includes the realization that production control of a live broadcast should be simplified and managed by minimal personnel. Advantageously, system 100 allows one person (e.g., production controller 114) to control, using a simple graphical user interface (GUI) of production controller device 110, all aspects of live broadcast 122.

Figure 4:
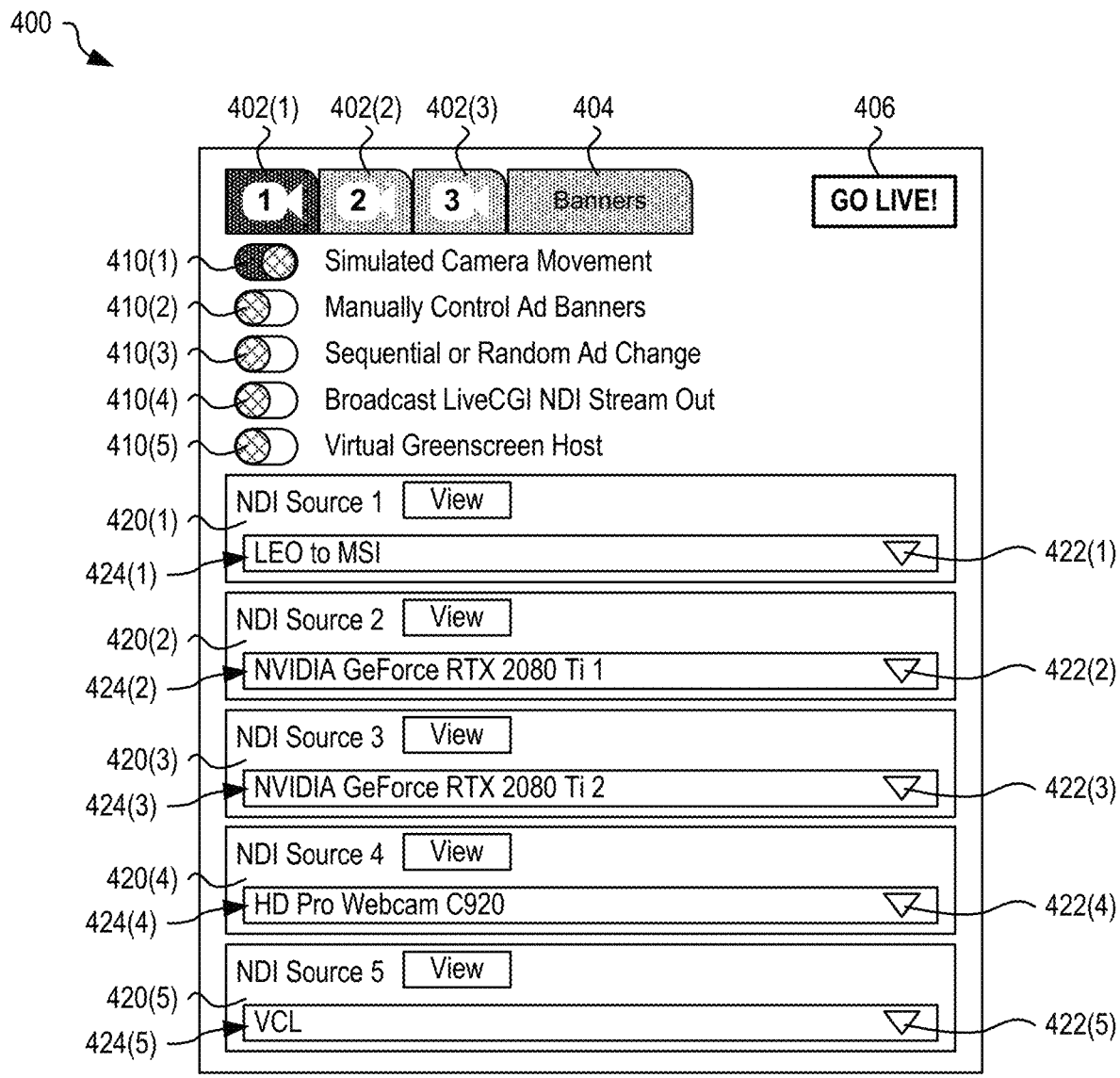
FIG. 4 shows one example production graphical user interface (GUI) that allows the production controller to define broadcast parameters that control the virtual environment and the live broadcast generated by the system of FIG. 1, in embodiments.

FIG. 4 shows one example production GUI 400 that allows production controller 114 to define broadcast parameters 112 to control virtual environment 125 and live broadcast 122 for use, by client device 130 for example, to generate one or more of a 2D, a 3D, a virtual reality (VR), augmented reality (AR), and any other metaverse, based upon volumetric content of both live and recorded media streams. GUI 400 includes a first camera tab 402(1), a second camera tab 402(2), and a third camera tab 402(3), that each show a camera icon with an embedded identifying number. GUI 400 also includes a banner tab 404 that enables production controller 114 to load in sponsor messages or advertising for display within virtual banner 212. Each camera tab 402(1)-402(3) represents a customizable set of configurations that define broadcast parameters 112 to control virtual environment 125 and live broadcast 122. The example of FIG. 4 shows settings for first camera tab 402(1) that may control properties of virtual environment 125 (e.g., the virtual newsroom) of FIG. 2. Production controller 114 may set/change properties defined by second camera tab 402(2) to define an alternative configuration of virtual environment 125 (e.g., an alternative newsroom setup). Production controller 114 may activate a "Go Live!" button 406 (shown in the top right corner of GUI 400) to cause the displayed settings (e.g., of camera tab 402(1) in this example) to be used to control virtual environment 125 and live broadcast 122.

Each camera tab 402 also includes five selectors 410, including: a simulated camera movement selector 410(1), a Manually Control Ad Banners selector 410(2), a Sequential or Random Ad change selector 410(3), a Broadcast LiveCGI NDI Stream Out selector 410(4), and a Virtual Greenscreen Host selector 410(5). Virtual Greenscreen Host selector 410(5) allows production controller 114 to configure a "green screen" element where something is chromakeyed in to a scene using a color separation system.

On each camera tab 402, GUI 400 also includes five source selectors 420(1)-420(5), each illustratively shown selecting an NDI source but could also select an RTMP source selector or an alternative live display source, that allows production controller 114 to select media streams 106, using a respective pull-down controls 422(1)-422(5), between available NDI sources, RTMP sources, and other live display sources for each of five possible video channels (e.g., first virtual channel 214(1), second virtual channel 214(2), third virtual channel 214(3), and so on). As noted above and discussed in greater detail below, media streams 106 may use, or may be converted to use, one of the NDI protocol, the RTMP, or other live display sources, to allow fast transmission via a single platform. Each camera tab 402(1)-402(3) includes five NDI source selectors 420(1)-420(5), each corresponding to a virtual channel 214 and allowing production controller 114 to select any media stream 106. Advantageously, source selectors 420(1)-420(5) allows any media stream 106 to be fed to any virtual channel 214 in virtual environment 125, thereby providing production controller 114 with the freedom to customize the arrangement and display of the newsroom. For example, production controller 114 may modify any virtual channel at any time by selecting a different media stream 106 within the corresponding source selector 420. In another example, production controller 114 may switch or swap different media streams 106 between two different virtual channels 214, thereby swapping the locations of the playing video streams within virtual environment 125 (and thus in live content 140).

Although not shown in FIG. 4, GUI 400 may provide additional controls for other aspects of virtual environment 125. For example, GUI 400 may include additional controls (e.g., on additional tabs) for greenscreen background, virtual environment, avatar formation, banner content, banner location, virtual camera location, virtual camera angle, virtual camera zoom, virtual camera movement, virtual camera tracking, other controls, and combinations thereof. GUI 400 may also include controls for merging video output on multiple screens to create a complete virtual environment as well as a full volumetric space.

As described above, conventional virtual newsroom applications map sources to channels manually, where each channel uses a separate application or window to connect to the source. Such manual control is time consuming and labor intensive. In contrast, GUI 400 advantageously allows production controller 114 to quickly define channel and source mapping from a single camera tab 402. This increases the versatility and utility of system 100.

Versatility of system 100 and GUI 400 allows production controller 114 to be located anywhere; production controller 114 is not required to be at a specific location (e.g., in a "studio" or "control-room" environment). In one example, production controller 114 may be located at a studio where the newscaster or performer (e.g., actor 108) is being recorded for a livestream, where both may even be in the same room. Alternatively, production controller 114 may be in different locations, such as different offices, different cities, different states, or even different countries. In certain embodiments, production controller 114 may be the newscaster (e.g., actor 108) where they produce their own show. Because system 100, through use of GUI 400, is easy to use, the newscaster (e.g., actor 108) may also act as production controller 114 and make changes while producing content, easily make changes while broadcasting content live.

Virtual Content Generation

Figure 5:
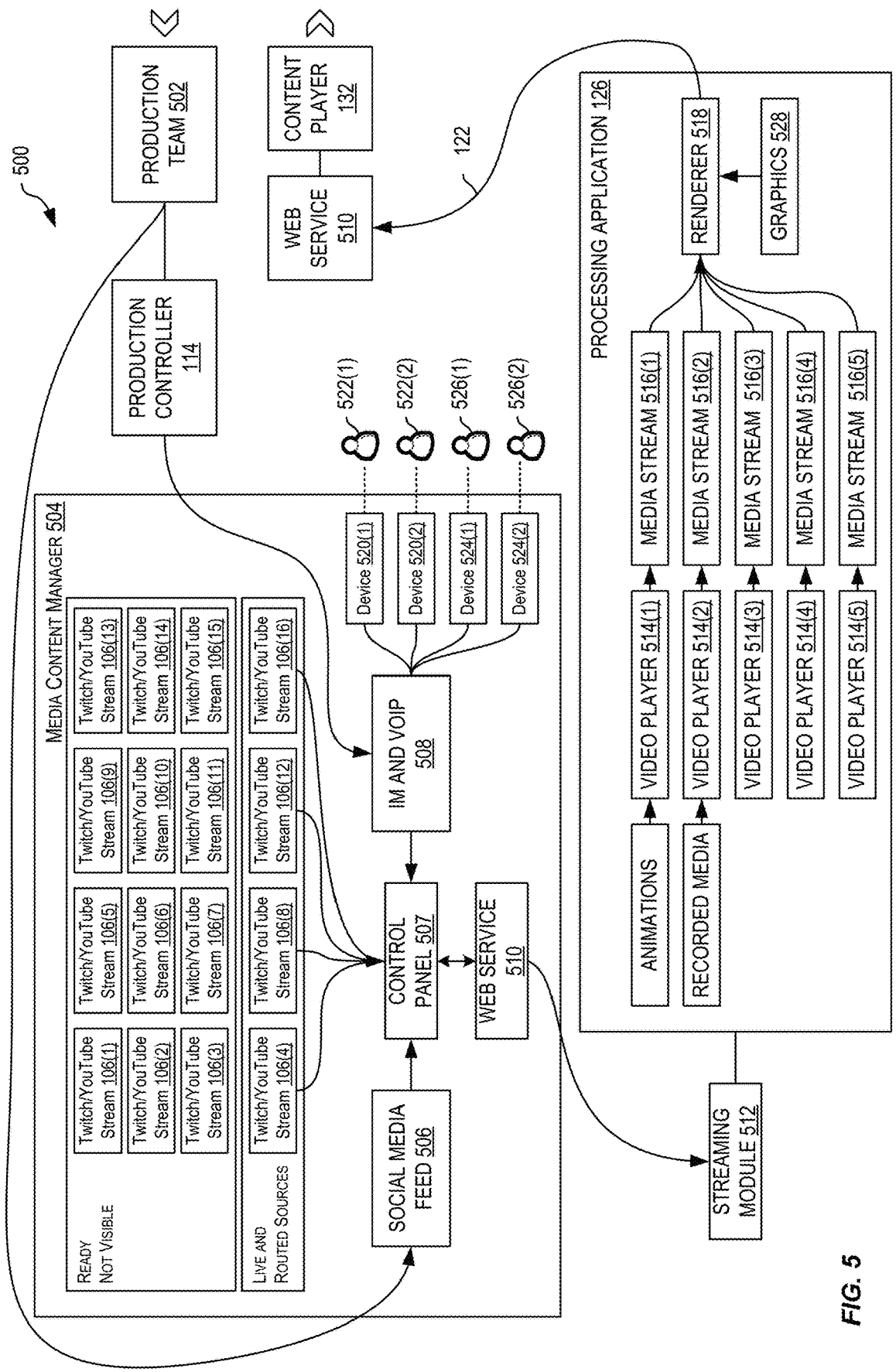
FIG. 5 is a functional block diagram illustrating example workflow implemented by the system of FIG. 1, in embodiments.

FIG. 5 is a functional block diagram 500 illustrating one example high level conceptual workflow view of system 100 of FIG. 1. Event coverage may start when a production team 502 is informed of the event and a production controller 114 is selected. A media content manager 504 represents software and/or functionality that may be implemented, at least in part, within server 120 of FIG. 1 to allow production controller 114 (and/or production team 502) to select and control use of many different media sources. In certain embodiments, media content manager 504 is implemented, at least in part, within production controller device 110. However, at least part of the functionality of media content manager 504 is implemented within content player 132 of client device 130, in certain embodiments. For example, within content player 132, where one media stream 106 is assigned to a node for output in live broadcast 122, the selection of media stream 106 may be modified by client device 130. Particularly, client device 130 is aware of media stream to node assignments and may change them.

In the example of FIG. 5, web service 510 may represent a cloud based service, such as Amazon Web Service (AWS) and/or Google Cloud, that is used to transport media streams 106. Web services 510 may be used in three different places by system 100. Web service 510 may also be used to carry data within system 100 (e.g., within media content manager 504); web service 510 may also be used to distribute live broadcast 122 to each client device 130 (e.g., carrying live broadcast 122 from server 120 to content player 132); and although not explicitly shown, web service 510 may also be used to transport media streams 106 from content capturing/streaming device 102 to server 120.

In certain embodiments, control panel 507 is an interface hosted by web service 510 that is used to control and provide input to system 100 (e.g., a composite run by Talent 522(1)). For example, production controller 114 accesses control panel 507, as a cloud based web service for example, to define a grid outlining how a production (e.g., a show) is to proceed. Media content manager 504 may mange a plurality of media streams 106 (shown as twitch/YouTube media streams 106(1)-106(16)) that may be selected to generate live broadcast 122 for output to one or more client devices 130. System 100 may also implement or use other types of media stream 106, such as an instant messaging (IM) and VoIP digital distribution platform 508, a social media feed 506 (e.g., an aggregation of media feeds that includes comments and social messages from services such as Tagboard®, and that are converted into video and/or other suitable formats for including as content), local cameras, AR and/or VR video sources (e.g., devices 520), locally stored media files, and so on. For example, IM and VoIP digital distribution platform 508 may receive and convert other media, such as a full screen video of Zoom call, a screen capture of text exchanged over Discord, and a volumetric transmission, into a media stream for input to system 100. System 100 may use input from other devices 520 and 524. In this example, device 520(1) is used to provide input from talent 522(1), device 520(2) is used to provide input from talent 522(2), device 524(1) is used to provide input from guest 526(1), and device 524(2) is used to provide input from guest 526(2).

System 100 may also include and/or use at least one streaming module 512 (e.g., Streamlink® opensource software) to stream video to a video player 514 (e.g., VLC, an opensource video player software by VideoLAN organization). Streaming module 512 streams one or more media streams 106, from various sources via web service 510, into at least one video player 514 (e.g., VLC), avoiding resource-heavy and unoptimized websites that may result in higher than expected latency. Video players 514 convert, if needed, media streams 106 received via streaming module 512 to use a common, universal video format, such as one of the NDI protocol or the RTMP, or any other convenient protocol that is output as one or more media streams 516(1)-(5).

Processing application 126 may implement 3D model 124 (see FIG. 1) to generate virtual environment 125 with many of the typical newsroom elements, including desks, artwork, props, plants, screens, monitors, and so forth. Processing application 126 applies selected media streams 106 to virtual channels 214 within the virtual newsroom. For example, processing application 126 may assign three different media streams 106 to three different virtual channels 214 of FIG. 2. When processing application 126 invokes renderer 518 to generate live broadcast 122 from 3D model 124, media streams 106 appear in corresponding display screens 204 in live broadcast 122. For example, renderer 518 generates a sequence of images of 3D model 124 from a perspective of a virtual camera positioned and oriented relative to 3D model 124. Renderer 518 may also include one or more graphics 528.

To facilitate selection of media streams 106 by production controller 114, processing application 126 may allow a handle 424 (e.g., a name or descriptive text, see FIG. 2) to be assigned to each media stream 106 received by server 120. Particularly, handle 424 is meaningful to production controller 114 and may indicate one or more of a source type, a media type, a capture device, and so on. Handles 424 may also be persistent, stored within server 120 for example, such that they may be reused to select the same media stream 106, or to select the same previously captured media content (e.g., previously recorded videos or images). Subsequent selection (e.g., using one pull-down control 422 of GUI 400 of FIG. 4) of handle 424 may retrieve new content from a live video feed of a corresponding media stream 106, or may select the same prerecorded media for replay or display.

However, system 100 does not prevent prerecorded media from being updated between playing if needed. For example, where a college professor uses system 100 to stream lectures to online students, the professor may wish to update certain media (e.g., lecture slides) from year to year. Accordingly, the professor may update certain slides of the media file, such that the next time that media file is accessed by system 100, using the same handle 424, the updated content is present in virtual environment 125 of subsequent lectures. In this manner, system 100 may be used, not only as a mechanism for live media streaming with multiple live sources, but also for live streaming using pre-recorded and/or pre-prepared media content.

Live broadcast 122 may be of any type of output, such as H.264 video which may be viewed using a conventional video player. Alternatively, live broadcast 122 may be data that is similar to data output by a streaming video game, whereby a compiler (e.g., a game graphical engine) on client device 130 compiles the data into graphics that are displayed to user 134.

As discussed above, processing application 126 may implement a gaming engine, similar to the Unreal engine, to generate live broadcast 122 from 3D model 124. In certain other embodiments, the gaming engine is implemented in content player 132 of client device 130, whereby content player 132 controls movement and rendering of avatar 220 within at least part of 3D model 124 when received from server 120. Processing application 126 enhances conventional game engine functionality by including live motion capture, live video capture, live avatar generation, and live rendering of a 3D model to generate a virtual environment, realistically resembling a newsroom or sports studio for example.

Figure 6:
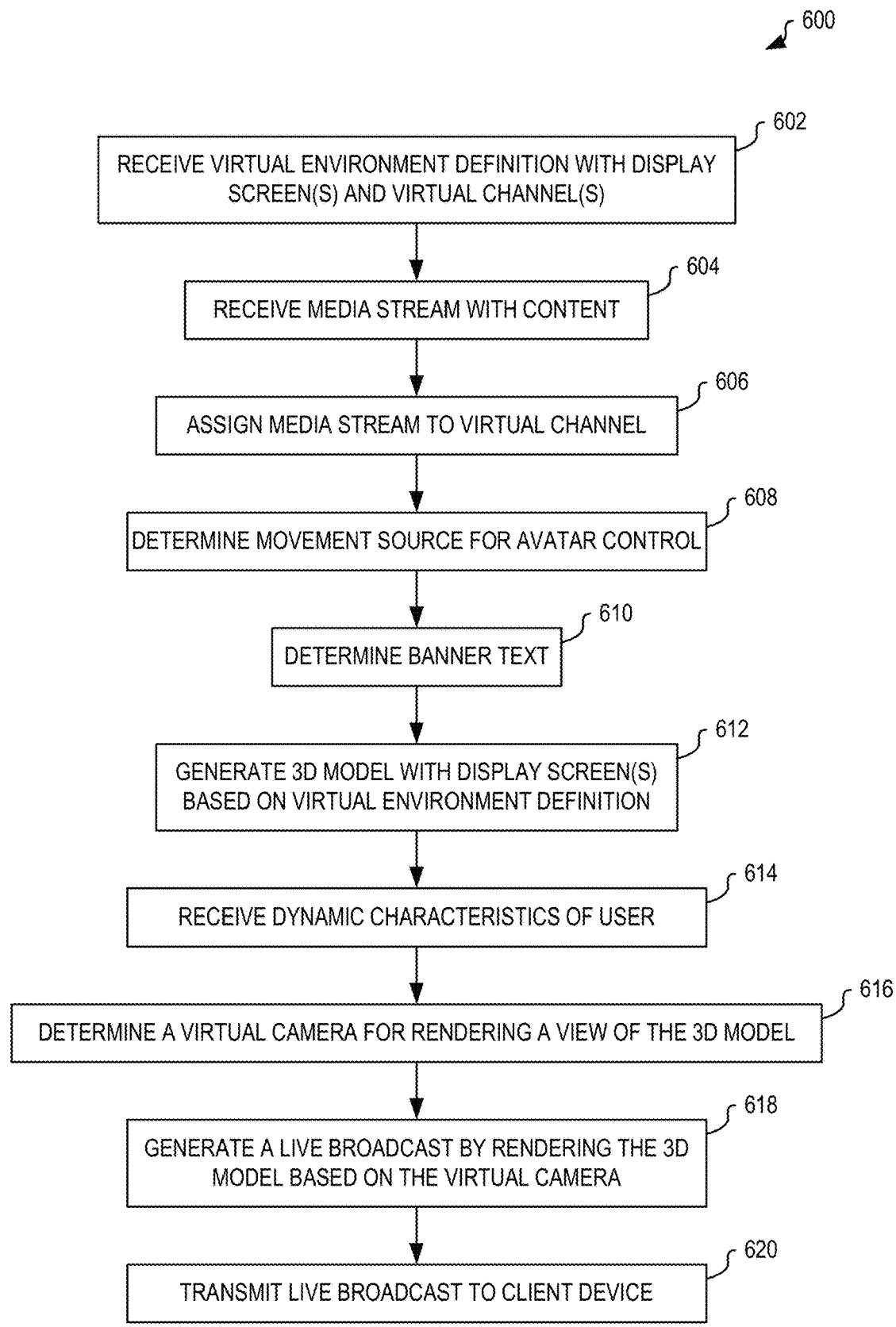
FIG. 6 is a flowchart illustrating one example method for displaying a virtual environment on a client device, in embodiments.

FIG. 6 is a flowchart illustrating one example method 600 for displaying virtual environment 125 on client device 130. Method 600 may be implemented, at least in part, in processing application 126 of server 120, FIG. 1, and, at least in part, in content player 132 of client device 130.

In block 602, method 600 receives a virtual environment definition with at least one display screen and at least one corresponding virtual channel. In one example of block 602, processing application 126 of server 120 receives broadcast parameters 112 from production controller device 110, where broadcast parameters 112 define, for 3D model 124, model elements (e.g., see model elements 810 of FIG. 8) for one or more structural components (e.g., static components 824, such as virtual desk 210, walls, ceiling, floor, lights, etc.), display screens 204, virtual channels 214, avatar 220, virtual banner 212, and so on, to represent virtual environment 125. In block 604, method 600 receives at least one media stream to provide live content. In one example of block 604, processing application 126 receives at least one media stream 106 with media content from content capturing/streaming device 102. In block 606, method 600 assigns the media stream to the virtual channel. In one example of block 606, based on broadcast parameters 112 received from production controller 114, processing application 126 assigns media stream 106 to first virtual channel 214(1) of virtual environment 125.

Block 608 is implemented when virtual environment 125 include avatar 220. In block 608, method 600 determines a movement source for avatar control. In one example of block 608, processing application 126 received broadcast parameters 112 from production controller device 110 based on production controller 114 interacting with GUI 400 to define at least one media stream 106 (e.g., configured as an iPhone running a movement capture application such as Rokoko) to provide motion control of avatar 220. In block 610, method 600 determines banner text. In one example of block 610, processing application 126 determines a text feed to provide information for display on virtual banner 212.

In block 612, method 600 generates a 3D model with display screens based on the virtual environment definitions. In one example of block 612, processing application 126 generates 3D model 124 with display screens 204, virtual desk 210, avatar 220, and virtual banner 212 to form virtual environment 125 as shown in FIG. 2. In block 614, method 600 receives dynamic characteristics of the user. In one example of block 614, processing application 126 receives dynamic characteristics 128 of user 134 at least in part from client device 130. In block 616, method 600 determines a virtual camera for rendering a view of the 3D model. In one example of block 616, production controller 114 uses production controller device 110 to define, using GUI 400, a virtual camera position (origin and orientation) relative to 3D model 124 and/or a virtual zoom, and production controller device sends the virtual camera position to processing application 126 as broadcast parameters 112. In another example of block 616, processing application 126 updates the virtual camera position and/or the virtual zoom based on dynamic characteristics 128 of user 134, thereby allowing user 134 to control the virtual camera position.

In block 618, method 600 generates a live broadcast by rendering the 3D model based on the virtual camera. In one example of block 618, processing application 126 renders a sequence of images of 3D model 124 based upon the defined virtual camera position and virtual zoom. In block 620, method 600 transmits a live broadcast to a client device. In one example of block 620, processing application 126 sends live broadcast 122 including the rendered images of 3D model 124 to client device 130, wherein content player 132 of client device 130 generates and outputs live content 140 as a view of virtual environment 125.

Lower Latency

Figure 7:
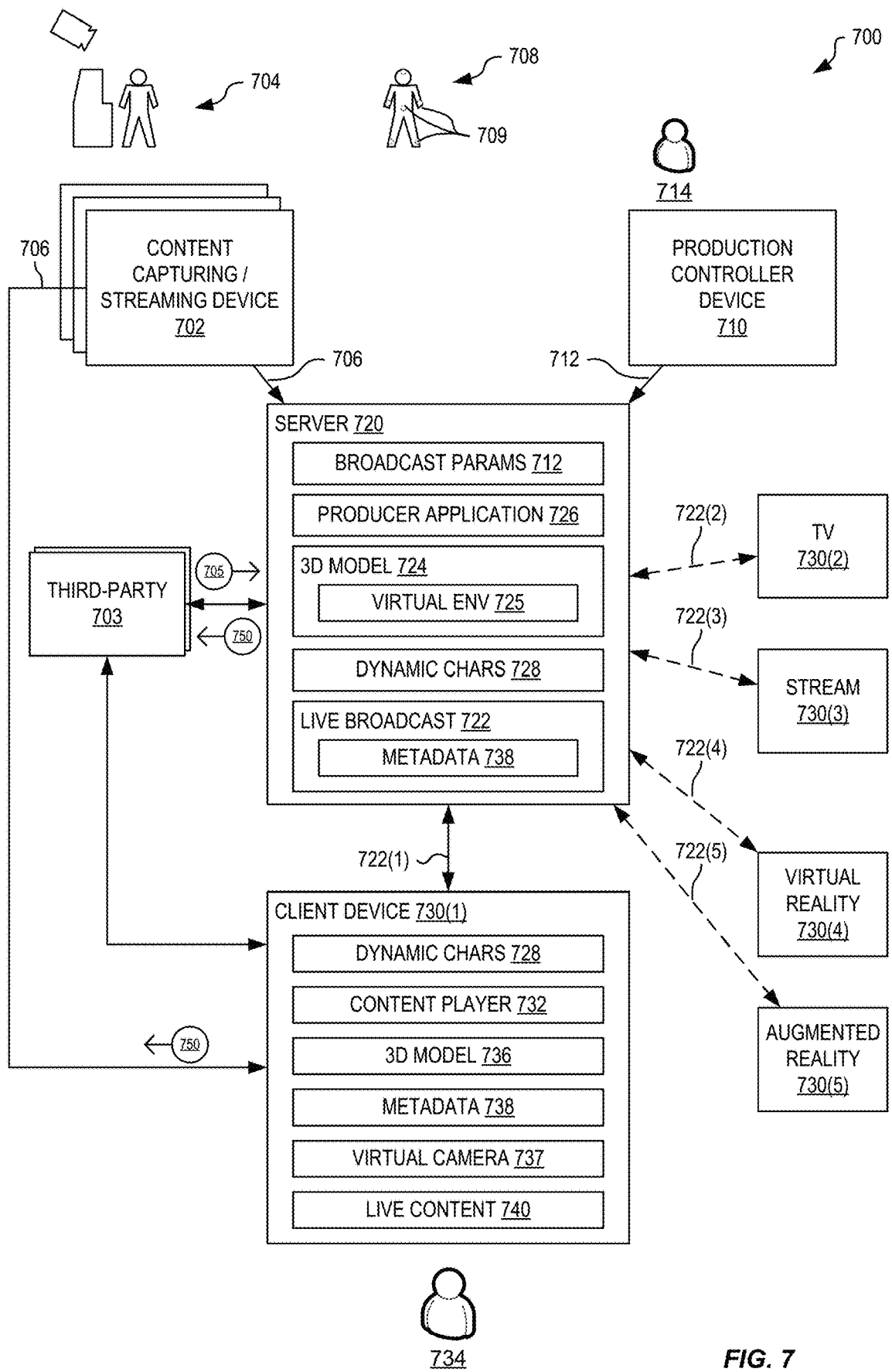
FIG. 7 shows one example system for generating live content of a virtual environment including nodes for content placements and with low latency for display on client devices, in embodiments.

FIG. 7 shows one example system 700 for generating live content of a virtual environment with low latency for display on client devices 730. System 700 is similar to system 100 of FIG. 1; a content capturing/streaming device 702 is similar to content capturing/streaming device 102, a live event 704 may be similar to live event 104, media streams 706 are similar to media streams 106, an actor 708 is similar to actor 108, sensors 709 are similar to sensors 109, a production controller device 710 is similar to production controller device 110, broadcast parameters 712 are similar to broadcast parameters 112, a production controller 714 is similar to production controller 114, a server 720 is similar to server 120, 3D model 724 is similar to 3D model 124, virtual environment 725 is similar to virtual environment 125 and includes similar elements, components and features, client devices 730 are similar to client devices 130, and live content 740 is similar to live content 140. 3D model 724 may also be referred to as a server 3D model. In certain embodiments, server 720 is implemented as a cloud-based service.

A producer application 726 of server 720 may include functionality that is similar to processing application 126, and may generate 3D model 724 as a base environment that includes static structural elements, such as walls, ceilings, floors, furniture, virtual screens, lights, and so on, based on broadcast parameters 712 defined by production controller 714 using production controller device 710. For example, production controller 714 may interactively define 3D model 724 using a volumetric diagram consisting of data, colors, patterns, and predictive measures.

A significant difference between system 100, of FIG. 1, and system 700, of FIG. 7, is that a content player 732 within client device 730 maintains a 3D model 736 and implements a renderer 914 that generates live content 740 from 3D model 736. Producer application 726 sends, in real-time, only changes to 3D model 724 (e.g., in live broadcast 722) to client device 730, and content player 732 updates 3D model 736 based on these changes. Accordingly, 3D model 736 is generated from 3D model 724. Advantageously, by sending only changes to 3D model 724, bandwidth required for live broadcast 722 is significantly reduced as compared to bandwidth required to send a continuous video stream to client device 730, and latency between capturing of live event 704 and displaying of live event 704 in live content 740 by client devices 730 is further reduced.

Production controller 714 (e.g., the producer of the virtual newsroom) may designate an initial number of nodes (initially empty) for virtual environment 725, where each empty node represents an opportunity for dynamically adding content (e.g., from media streams 706) to virtual environment 725. In other words, the empty nodes represent placeholders in 3D model 724 where content may be added. Unlike processing application 126 of system 100, producer application 726 does not add content from media streams 706 to 3D model 724 and does not render 3D model 724. Rather, producer application 726 sends the empty nodes to content player 732 of client device 730, and content player 732 fills the empty nodes with content from media streams 706 to form full nodes, adds the content from media streams 706 to 3D model 736 based on the full nodes, and then renders 3D model 736 to generate live content 740. Advantageously, system 700 builds and maintains 3D model 724 in sever 720 without the complexity of adding content from media streams 706 to 3D model 724, and allows content player 732 to select content from media streams 706 specifically for user 734 and add the selected content to 3D model 736. Accordingly, 3D model 736 may be customized for user 734. Content player 732 then renders the 3D model 736 to generate live content 740 as a single coherent content stream, rather than as one or more media streams added as layers on top or below a main stream, as done in the prior art. This single coherent content stream (live content 740) provides user 734 with a direct tie to the content story and user 734 experiences "deep links" that may be a customized version relative to the main story generated by server 720. A deep link is, for example, a mechanism analogous to a hyperlink on a web page, that allows user 734 to access additional information related to the content. For example, where the content includes a particular product that user 734 wishes to purchase, the corresponding deep link allows user 734 to make that purchase. In another example, a deep link may allow user 734 to enter a bet related to content including an athlete and/or sports team. The deep links may lead to other links that allow user 734 to retrieve additional information relevant to the content, such as by allowing user 734 to view additional information. For example, a first deep link may provide information about Virginia Tech Football, which in turn includes other deep links to information about the Quarterback position of that team. Generating customized live content 740 based on the empty nodes is described below with reference to FIG. 10. Particularly, the use of nodes makes the virtual content addressable, such that it may be targeted to specific user characteristics.

Producer application 726 generates live broadcast 722 as a composite data stream with metadata 738 that defines at least part of 3D model 724 such that content player 732 may generate and/or update 3D model 736 to resemble and follow 3D model 724. In one example, based on broadcast parameters 712, producer application 726 generates 3D model 724 to define the basic structure of virtual environment 725, and a definition of this basic structure is included within metadata 738. Where parts of virtual environment 725 are dynamic, producer application 726 may update 3D model 724 to reflect any structural changes to virtual environment 725. Producer application 726 generates metadata 738 with sufficient information to allow content player 732 to generate live content 740. Content player 732 is implemented as software with machine readable instructions that, when executed by a processor of client device 730, receives metadata 738 in live broadcast 722 from server 720 and generates a 3D model 736 defining the base environment and then updates 3D model 736 in real-time as metadata 738 is received. Content player 732 then renders 3D model 736 to generate live content 740 for output from client device 730.

As shown in FIG. 7, live broadcast 722(1) is output to client device 730(1), which may represent a mobile device, live broadcast 722(2) is output to client device 730(2), which may represent a television, live broadcast 722(3) is output to client device 730(3), which may represent a gaming console, personal computer, live broadcast 722(4) is output to client device 730(4), which may represent a virtual reality player, and live broadcast 722(5) is output to client device 730(5), which may represent an augmented reality player. Content player 732 renders 3D model 736 to generate live content 740 in a format suitable for the type of device on which it is running. For example, content player 732 generates live content 740 in a VR format when running on virtual reality device 730(4) and generates live content 740 in a AR format when running on augmented reality device 730(5). Accordingly, content player 732 generates live content 740 to provide a more in-depth experience for each client device 730. In certain embodiments, content player 732 uses sensor data captured by sensors of client device 730 to control rendering of 3D model 736 and generation of live content 740. For example, augmented reality device 730(5) may capture live video from a camera of augmented reality device 730(5) and content player 732 may use the video to generate live content 740 as an augmented reality image. Thus, in some embodiments, live content 740 may be considered a live data experience.

Metadata 738 may include any type of data that enable client device 730 to generate live content 740, and metadata 738 may include links (e.g., URLs) to media streams 706 (e.g., one or more of motion capture sensor data captured by sensors 709 on actor 708 for use with an avatar in virtual environment 725, video sources, media sources, etc.), data defining a virtual camera 737, authorization and authentication information thereof, advertiser information, theme and/or environment selection for virtual environment 725, and so on. Content player 732 uses metadata 738, received in live broadcast 722, to connect with one or more media streams 706, to update 3D model 736 at client device 730. The use of metadata 738 and content player 732 within client device 730 significantly reduces the bandwidth used by live broadcast 722, as compared to bandwidth of high definition video for example, and reduces the workload on server 720. Thus, reduced workload, lower bandwidth requirement, and rendering by content player 732 on client device 730, further reduces latency between capture of live event 704 to output of live content 740 on a display 906 of client device 730. Particularly, the base environment of largely inanimate objects is not included repeatedly within metadata 738, whereas animated portions of 3D model 724 (e.g., avatars and changeable video definitions) are included in metadata 738. This further reduces the amount of data send from server 720 to client device 730, thereby supporting reduced latency.

As an example, for a broadcast event, content player 732 may receive static elements of 3D model 724, updating avatar 220 and virtual camera 737 as needed, and then render live content therefrom. This may further improve video quality by freeing up transmission bandwidth for objects that are not static.

Content player 732 updates 3D model 736 based upon metadata 738 and renders a view of 3D model 736 to generate live content 740. In certain embodiments, metadata 738 includes audio data captured by one or more audio sensors (e.g., one of sensors 709 on actor 708). In certain embodiments, content player 732 is based on the Unreal engine, or other similar graphical software, and generates and/or updates 3D model 736 according to metadata 738 received in live broadcast 722, and then generates live content 140 for output on display 906 client device 730 by rendering images of 3D model 736. In one example of operation, based on metadata 738, content player 732 connects with one or more content capturing/streaming devices 702 to directly receive one or more media streams 706, and/or may retrieve other media (e.g., images, stored video, etc.) directly from other sources. Content player 732 further updates 3D model 736 with content received in media streams 706 to form virtual environment 725. Where 3D model 736 includes an avatar (e.g., avatar 220), content player 732 controls avatar motion within 3D model 736 based upon corresponding media streams 706 and/or metadata 738, and then renders live content 140 from 3D model 736.

The reduced latency described above allows system 700 to provide short period betting. Short period betting is largely unavailable for livestreamed events due to latency between the event capture and output of the live stream on client devices. System 700 may provide sub-second latency between capture of live event 704 and output of live content 740, and therefore short period betting using system 700 is possible. Short period betting may include betting on the outcome of a portion of a sporting event, such as a football play, a soccer possession, a basketball possession, a golf hole, a golf swing, gaming operations, and so forth. Short period betting may also include betting on the outcome of other short period items, such as a hand in a poker tournament.

In the example of FIG. 7, at least one third-party 703 (e.g., a gambling bookkeeper) may interface with server 720 to provide input that may be used to control live content 740, such as using the input data to control metadata 738 that is output in live broadcast 722. See, for example, gambling data 1048 of FIG. 10, that may correspond to input data 705 from third-party 703 that includes wagering opportunities corresponding to live event 704. Producer application 726 may add wagering opportunities received in input data 705 to metadata 738 as gambling data 1048. Accordingly, the wagering opportunities are passed, in real-time, to client device 730 in metadata 738. Gambling data 1048 may include links (e.g., URLs) to third party 703. In another example, where third party 703 represents an advertising entity, producer application 726 may add advertising data received in input data 705 to metadata 738 as third-party data 1044. Third-party data 1044 may contain links to third party 703 and/or to other sources of advertising content. For example, third-party data 1044 may include links to different soft drink content related to and corresponding classifications. In one example of operation, where live event 704 is an American football game, third-party 703 may provide input data 705 defining gambling opportunities related to the live action, such as a prop-bet on the outcome of a next play. Producer application 726 processes input data 705 and includes the wagering opportunity within metadata 738, such that it may be output in live broadcast 722. Within client device 730, content player 732 processes metadata 738 based on dynamic characteristics 728, and if appropriate for user 734, updates 3D model 736 to include the wagering opportunity in live content 740. Where user 734 responds (e.g., by tapping the screen) to accept the wagering opportunity, content player 732 immediately enables direct communication between client device 730 and third party 703 (e.g., using a corresponding account number, and/or other identification information of user 734 previously configured with third party 703), shown as message 750, directly to third party 703, such that the corresponding wager is placed. When the play in the live event 704 is finished, third-party 703 may send results of the wager to user 734 using a similar process, whereby 3D model 736 and live content 740 are updated by content player 732 to show the wagering outcome. Accordingly, transactions between user 734 and third party 703 occur external of server 720, but are facilitated, in real-time, by server 720.

In another example of use, system 700 may improve an education experience where live event 704 is a live lecture. Through low latency, system 700 allows students to ask questions in real time, without the delay common in conventional live lectures. For example, as compared to conventional online learning, where capture, processing and transmission of video data to each online student invariable incurs latency of processing and data transmission, since system 700 reduces the needed bandwidth of transmission (by only sending changes to the 3D model) while maintaining a real-time output of the live lecture, system 700 provides a more responsive environment, particularly where some students are attending the live lecture in person and other are viewing remotely using system 700. In another example, low-latency livestreaming of system 700 improves sports commentary by allowing commentators to comment on sporting events remotely, and/or by allowing multiple commentators to comment on a live sporting event from different locations. Advantageously, live content 740 includes low-latency livestreaming of 2D, 3D, and/or volumetric content that improves the sports betting experience by allowing user 734 to view and respond to live events faster (e.g., in real-time) without customary delays in transmission of other prior art broadcast systems and without the need to switch to other devices or feeds to make bets.

Automatic Content Customization

Figure 10:
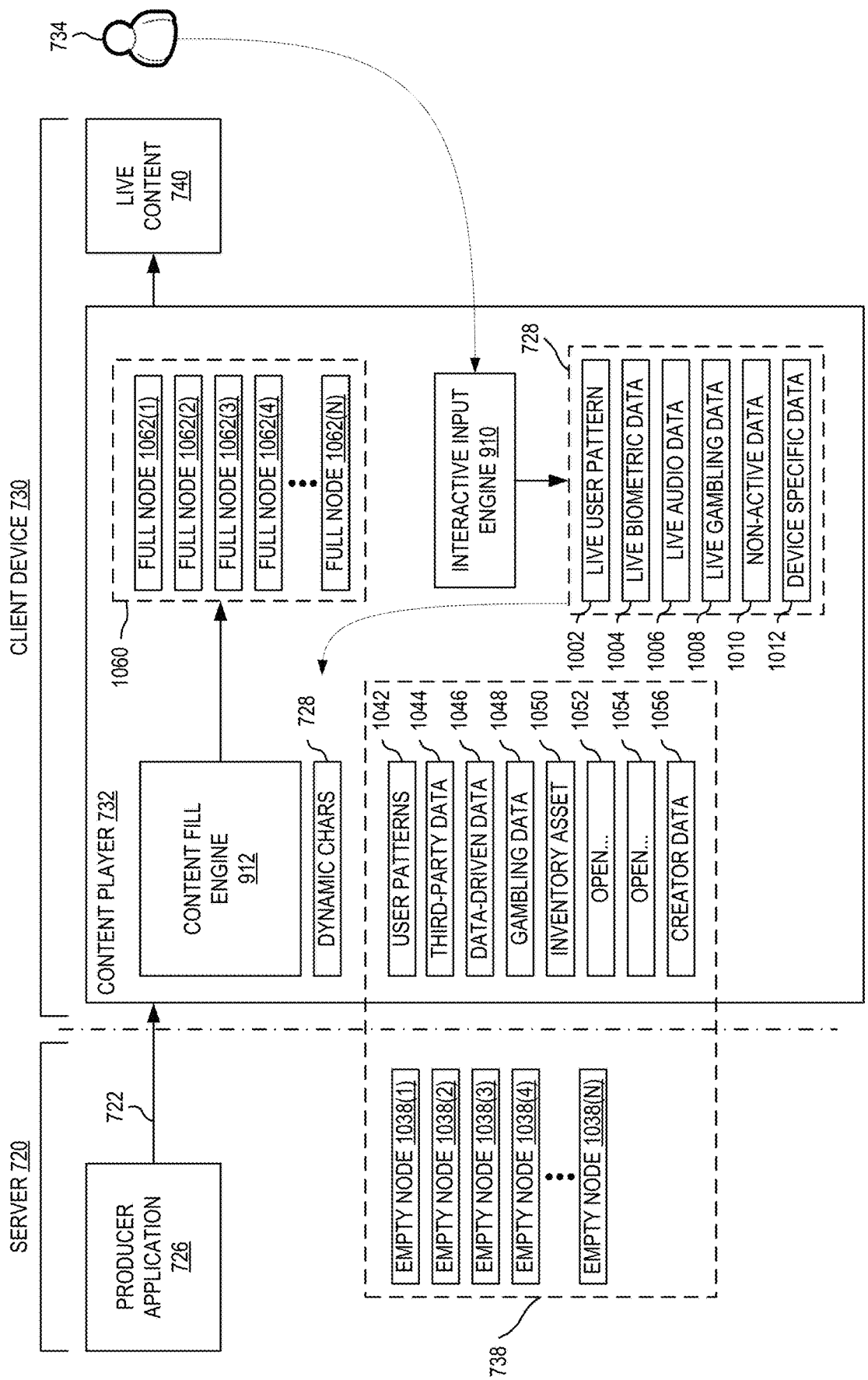
FIG. 10 is a schematic diagram illustrating the metadata of FIG. 7 in further example detail and illustrating use of the metadata in media streams to generate the live content to facilitate advertising, betting, and consumer behavior, in embodiments.

In certain embodiments, system 700 customizes live content 740 for each user 734. 3D model 724 represents virtual environment 725 with at least one display screen 204 that has a virtual channel (e.g., virtual channel 214, FIG. 2) that is associated with an empty node (see empty nodes 1038 of FIG. 10). System 700 assigns content to fill the empty nodes based, at least in part, on interaction of user 734 with client device 730 and at least in part from input from one or more third parties. System 700 displays the full nodes within virtual environment 725 as live content 740, allowing user 734 to interact with the experience using client device 730. System 700 may update how empty nodes are filled, and thus change the experience provided by live content 740 over time. This customization of live content 740 for each user 734 increases user interaction with system 700, by providing content that is more suitable and by providing interactive feature such as one or both of betting and advertising. The use of nodes makes virtual content addressable, such that it may target specific user characteristics.

System 700 may customize live content 740 for live event 704 and also for pre-recorded events. Unlike conventional video feed advertising, content player 732 does not present fixed advertisements or banners. However, one or more nodes (e.g., empty nodes 1038 of FIG. 10) may be designated for a particular type of content, and content player 732 may select content to fill the node based on metadata 738 and dynamic characteristics 728 of user 734. Producer application 726 may create 3D model 724 (e.g., a volumetric model) to have an initial number of empty nodes (corresponding to display screens 204 within virtual environment 725) and may assign media streams 706 and/or other media sources, to these nodes. However, the number of nodes may increase or decrease based on the content consumed by user 734 and other factors captured in dynamic characteristics 728, such as any one or more of location, sports team affiliation, gambling habits, browsing habits, betting estimates, browsing estimates, and any other predictive analytical pattern process. Content assigned to each node may be live (e.g., an assigned media stream 706) or pre-produced, such as an advertisement, graphics, charts and graphs, an audio file, a betting prompt, a volumetric view, a multi-dimensional model, a lesson plan, or any other media content.

Over time, client device 730 and server 720 collect dynamic characteristics 728 of user 734 that may include one or more of a live user pattern, live biometric data, live audio data, live gambling data, non-active data, and device specific data. (See FIG. 10 for further details.) Content player 732 may customize live content 740 for user 734 based upon collected dynamic characteristics 728. For example, based upon patterns of user 734 in interacting with content player 732 to control live content 740 (e.g., selecting specific content, following a particular athlete, interacting with displayed content, gambling history, etc.) content player 732 automatically customizes live content 740 for user 734. Metadata 738 may also include customizations preferred by content providers, and content player 732 may combine these preferred customizations with dynamic characteristics 728 of user 734 to generate live content 740. Content player 732 may use weighted calculations to automatically assign media streams 706 to virtual channels 214 of virtual environment 725 based upon dynamic characteristics 728 and customizations preferred by content providers.

Content player 732 may customize live content 740 for user 734 based upon personal configuration settings. For example, content may be customized for accessibility by using custom fonts and sizes in graphic displays, and/or using audio to speak textual content. Accessibility customization is described in further detail with reference to FIG. 10.

Figure 8:
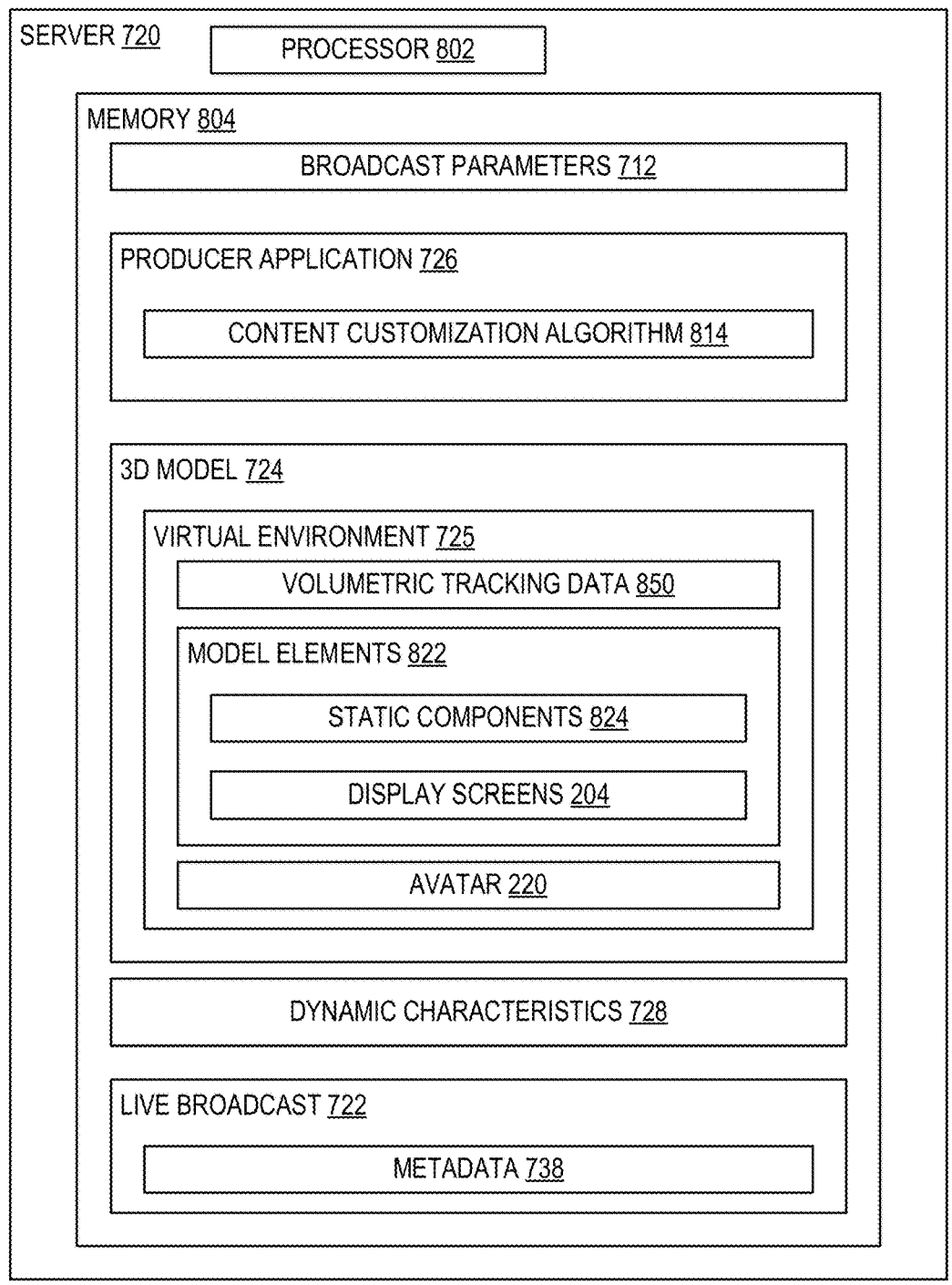
FIG. 8 is a block diagram showing the server of FIG. 7 in further example detail.

FIG. 8 is a block diagram showing server 720 of FIG. 7 in further example detail. Server 720 is a computer that includes at least one processor 802 communicatively coupled to memory 804 storing broadcast parameters 712, producer application 726, 3D model 724. Memory 804 is also shown storing live broadcast 722, generated by producer application 726 for output to one or more client devices 730.

Producer application 726 includes machine readable instructions that, when executed by processor 802, control server 720 to receive broadcast parameters 712 from production controller device 710, generate and update 3D model 724, and generate metadata 738 for output in live broadcast 722. Metadata 738 is a defined data structure (see FIG. 10) that facilitates generation of live content 740 by content player 732 of client device 730. For example, metadata 738 allows content player 732 to update 3D model 736 within client device 730, to control movement of avatar 220 within 3D model 736, to connect with, and receive media streams 706 directly from, one or more content capturing/streaming devices 702.

Broadcast parameters 712 may define one or more model elements 822 of 3D model 724 to define virtual environment 725, which may include volumetric tracking data 850. Volumetric tracking data 850 may define how one or more of components, avatar 220, display screens 204, etc., of virtual environment 725 may be animated. In one example, broadcast parameters 712 may define one or more static components 824 (e.g., walls, desks, etc.), one or more display screens 204, and an avatar (e.g., avatar 220) that define virtual environment 725 as a newsroom. Producer application 726 generates metadata 738 to allow content player 732 of client device 730 to build a local 3D model 736 and generate live content 740 to resemble virtual environment 725.

Producer application 726 may include a content customization algorithm 814 that generates and customizes metadata 738 based upon dynamic characteristics 728 of user 734. For example, content customization algorithm 814 may identify, within metadata 738, one or more media streams 706 that have more suitable content, and/or identify one or more media steams 706 that have less suitable content, for user 734 based on collected dynamic characteristics 728 of user 734. Accordingly, server 720 may customize live broadcast 722 for each user 734.

Figure 9:
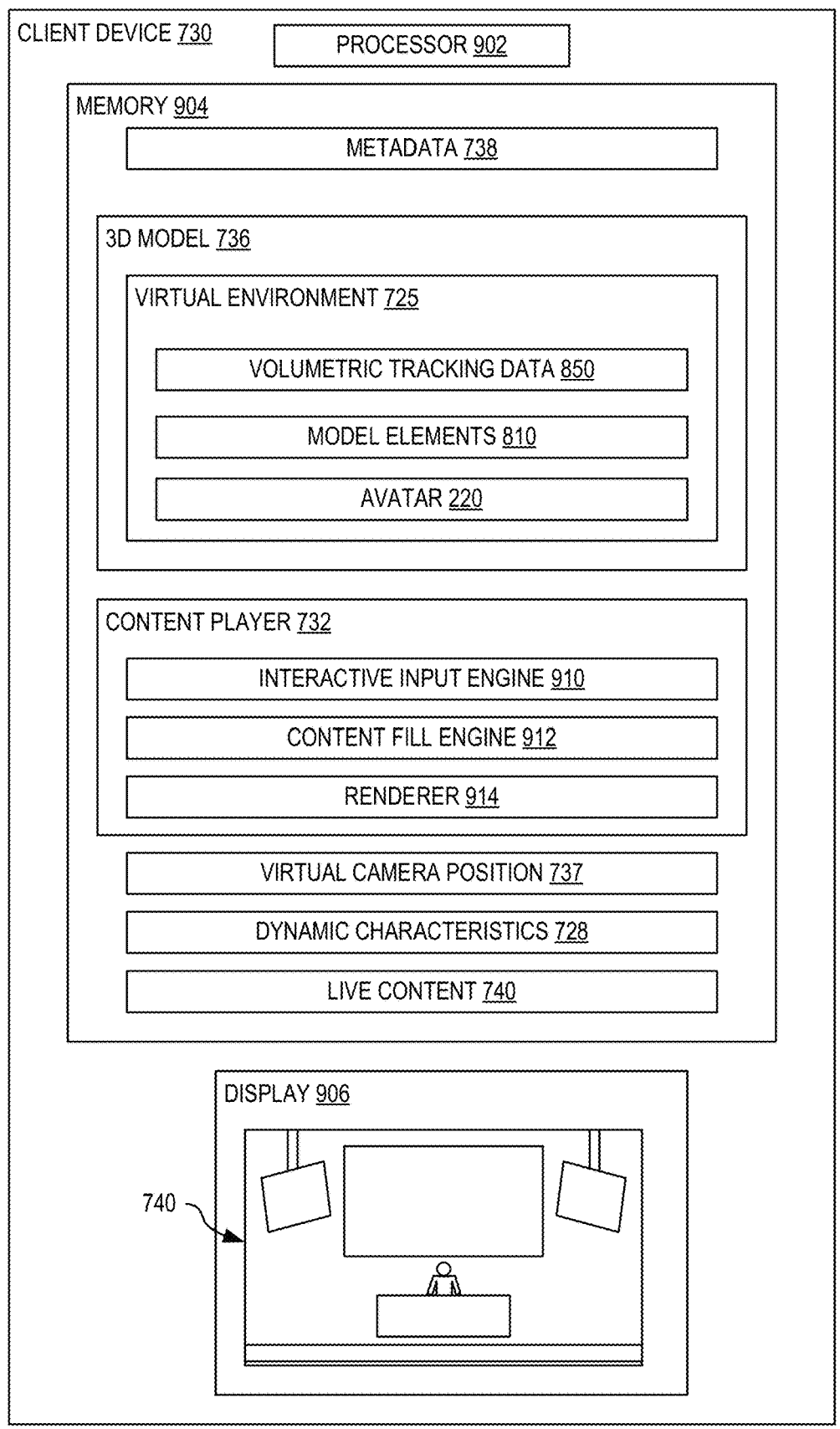
FIG. 9 is a block diagram showing the client device of FIG. 7 in further example detail.

FIG. 9 is a block diagram showing client device 730 of FIG. 7 in further example detail. Client device 730 includes at least one processor 902 communicatively coupled with memory 904. Memory 904 includes content player 732, implemented as machine readable instructions that, when executed by processor 902, control client device 730 to provide the functionality described herein. Content player 732 may include an interactive input engine 910 and a content fill engine 912, each representing software modules with one or more algorithms implemented by machine readable instructions executable by processor 902. More particularly, interactive input engine 910 and/or content fill engine 912 may include or use artificial intelligence with machine learning. For example, interactive input engine 910 and/or content fill engine 912 may include one or more AI algorithms that predict needs of user 734 and provide custom content to user 734 by assigning appropriate media streams 706 to empty nodes 1038, such that user 734 is presented with content that is more relevant and more engaging that non-customized content.

Although shown as part of content player 732, interactive input engine 910 and content fill engine 912 may be independent modules that cooperate within client device 730. In certain embodiments, at least parts of interactive input engine 910 and content fill engine 912 Interactive input engine 910 captures dynamic characteristics 728 of user 734 interacting with, and not interacting with, client device 730. Dynamic characteristics 728 may include one or more of a live user pattern, live biometric data, live audio data, live gambling data, non-active data, and device specific data (each described in further details with reference to FIG. 10). Interactive input engine 910 makes dynamic characteristics 728 available to content fill engine 912, and may send dynamic characteristics 728 to server 720. In one example of operation, content fill engine 912 may determine, based upon one or more of user patterns 1042, third-party data 1044, data-driven data 1046, and creator data 1056 that certain content provided by one or more media streams 706 include soft drinks. Interactive input engine 910 detects movements, responses, and other inputs of user 734 as dynamic characteristics 728 that are input to content fill engine 912.

Content player 732 generates and/or updates at least part of 3D model 736, based on metadata 738 received in live broadcast 722, to include model elements 810 and avatar 220 as defined by producer application 726 of server 720. Content fill engine 912 further updates 3D model 736 based, at least in part, upon dynamic characteristics 728. Content player 732 may then generate live content 740 by rendering a view of 3D model 736 based at least in part upon virtual camera 737 defined within metadata 738 and updated by content fill engine 912. Accordingly, live content 740 is customized by dynamic characteristics 728 of user 734.

Metadata Details

FIG. 10 is a schematic diagram illustrating metadata 738 of FIG. 7 in further example detail and illustrating how metadata 738 in live broadcast 722 generates customized live content 740 that includes one or more of advertising, betting, and so on, that may drive behavior of user 734. A left portion of FIG. 10 represents server 720 and a right portion of FIG. 10 represent client device 730. Interactive input engine 910 of client device 730 captures dynamic characteristics 728 of user 734 as user 734 interacts with client device 730 while watching live content 740. For example, interactive input engine 910 may capture dynamic characteristics 728 to include one or more of current location, sports team affiliations, gambling habits, browsing habits, betting estimates, browsing estimates, and/or any other data or patterns that may allow predictive analysis. In the example of FIG. 10, dynamic characteristics 728 include live user pattern 1002, live biometric data 1004, live audio data 1006, live gambling data 1008, non-active data 1010, and device specific data 1012. Live user pattern 1002 may represent trends of user 734. For example, based upon activity of user 734 captured by interactive input engine 910, live user pattern 1002 may indicate that user 734 likes to bet on players in the NBA and has a proclivity towards betting on LeBron James. Accordingly, live content 740 may be subsequently customized by content fill engine 912, to notify user 734 of a betting opportunity when LeBron James has his next game. Where user 734 provides consent for their data to be tracked by system 700, user 734 may also be presented, via live content 740, with their recent betting history, their results, and results of other fans, of other regions, and other such related information to help them wager. Live biometric data 1004 may represent, for user 734, one or more of heart rate, respiratory rate, temperature, and so on. Live audio data 1006 may represent captured utterances of user 734, such as gasps or sighs. Live gambling data 1008 may represent wagers made, betting amounts, wins and losses, and so on. Non-active data 1010 may represent the amount of time where user 734 is not actively interacting with client device 730. Device specific data 1012 may represent interactive input specific to the device type of client device 730. For example, where user 734 has permitted their personal location data to be used, one or more of third-party 703, server 720, and AI within interactive input engine 910, may determine that user 734 enjoys eating hamburgers with a preference for a certain brand, and define device specific data 1012 to include hamburgers and the specific brand preference of user based on location data captured by a mobile phone of user 734. Accordingly, content fill engine 912 may select content related to the particular brand and type of food when a food related advertisement is to be include in live content 740. Advantageously, user 734 sees advertisements that are of interest, and therefore the advertiser is more successful. This is beneficial to user 734, the content creator, and the advertiser. Collectively, live user pattern 1002, live biometric data 1004, live audio data 1006, live gambling data 1008, non-active data 1010, and device specific data 1012 may be analyzed to determine habits of user 734 that may be used to enhance content in live content 740 and thereby enhance the experience for user 734. Interactive input engine 910 inputs at least part of dynamic characteristics 728 to content fill engine 912. In certain embodiments, interactive input engine 910 also sends at least part of dynamic characteristics 728 to server 720.

Producer application 726 of server 720 generates metadata 738 to include a plurality of empty nodes 1038 (illustratively shown as empty nodes 1038(1)-(N)). The number of empty nodes 1038 may increase or decrease based on content consumed by user 734 and may further depend on a variety of factors including one or more of location, zip code, team affiliation, gambling practice, browsing practice, betting estimate, browsing estimate, or any other predictive analytical pattern process. Each empty node 1038(1)-(N) is a placeholder corresponding to 3D model 724 where content may be added to virtual environment 725. Each empty node 1038 may be assigned to one feature of 3D model 724. In one example, empty node 1038(1) may be assigned to first virtual channel 214(1) (FIG. 2) of virtual environment 725, empty node 1038(2) may be assigned to second virtual channel 214(2), and empty node 1038(3) may be assigned to third virtual channel 214(3). However, within metadata 738, content is not assigned to empty nodes 1038.

Content fill engine 912 includes one or more algorithms that process information from multiple inputs, including metadata 738 from server 720 and dynamic characteristics 728 from interactive input engine 910. As shown in FIG. 10, content fill engine 912 processes one or both of (a) metadata 738 including user patterns 1042, third-party data 1044, data-driven data 1046, gambling data 1048, inventory asset 1050, and creator data 1056 (and other information as needed—indicated as open 1052 and 1054) and (b) dynamic characteristics 728 including live user pattern 1002, live biometric data 1004, live audio data 1006, live gambling data 1008, non-active data 1010, and device specific data 1012, to generate assigned content 1060 that includes full nodes 1062(1)-(N) that correspond to empty nodes 1038(1)-(N) of metadata 738, but that have content assigned by algorithms of content fill engine 912. Interactive input engine 910 and/or content fill engine 912 may use AI algorithms to convert empty nodes 1038 into full nodes 1062 by selecting one of media streams 706 for one or more empty nodes 1038 to determine full nodes 1062 with selected content based on dynamic characteristics 728. For example, interactive input engine 910 and content fill engine 912 cooperate to select which game to include in live content 740, which player to focus on in live content 740, which commercial to insert into live content 740, which announcer audio to include in live content 740, and so on.

Live user patterns 1002 represent decisions made by user 734 and captured by interactive input engine 910 and may also include results of predictive analytics that take into account habits and desires of user 734. For example, live user patterns 1002 may represent decisions the user makes while interactive with client device 730, and include selected options, how long user 734 watched live content 740, when user 734 adjusts audio output levels, and when user 734 makes bets. Creator data 1056 may be received within metadata 738 from server 720 and/or within metadata of a corresponding media stream 706 and is provided by creators of media streams 706 (e.g., creators of content that are associated with one of content capturing/streaming devices 702) and designates affiliated content and/or one or more of supporting material, suggestive next content to experience, audio to reference, gambling bets to make, fantasy sports predictions, opinion polls, election results, and so on. In one example of operation, to simplify placing bets on a particular horse, user 734 may interactively remove content relating to other horses such that only content on the particular horse is provided in live content 740. This is facilitated through virtual environment 725 (e.g., a volumetric broadcasts), where user 734 interactively removes other horses from live content 740 such that content fill engine 912 provides only betting material relating to the particular horse that user 734 is interested in based on creator data 1056. In certain embodiments, creator data 1056 is retrieved directly from content capturing/streaming devices 702, for example as metadata within media streams 706 or directly from an associated server of content capturing/streaming device 702.

User patterns 1042 may be received within metadata 738 from server 720 and defines patterns previously determined from behavior of user 734. For example, user patterns 1042 may include product preferences, content preferences, sporting team associations, viewing habits, and so on.

Third-party data 1044 may be received within metadata 738 from server 720 and is provided by one or more of advertisers, marketers, educators, or anyone using system 700 to drive a message to user 734. Third-party data 1044 may define one or more of a web URL, an asset tracker, a consumer marketing tracker, and a custom asset manager. For example, third-party data 1044 includes information captured external to system 700, such as from third-party servers and applications. For example, third-party data 1044 may include workout data from a workout server or application (e.g., another application running on client device 730 or otherwise associated with user 734), whereby content fill engine 912 selects and/or generates content based upon results of the workout, such as by presenting, within live content 740, positive messages regarding effort made during the workout, and/or frequency of the workout, and so on. In one example of operation, production controller 714 may designated one empty node 1038 for advertising soft drinks. To fill this empty node 1038, content fill engine 912 processes at least user patterns 1042 and third-party data 1044 of metadata 738, and at least live user patterns 1002 of dynamic characteristics 728 to select one of media streams 706 and/or other linked content to generate a corresponding full node 1062 that is customized for user 734. For example, where empty node 1038 is assigned to a soft drink advertisement, and one or more of user patterns 1042 and/or live user patterns 1002 indicates a soft drink preference of user 734, content fill engine 912 selects content for full node 1062 to match the soft drink preference.

Data-driven data 1046 may be received within metadata 738 from server 720 and may include data from live event 704, collected by at least one content capturing/streaming devices 702 for example, and may include data specifically related to live event 704 that may be presented to user 734 within live content 740. For example, data-driven data 1046 may include statistics on one or more players at live event 704 and/or statistics about fantasy teams of user 734. In another example, data-driven data 1046 includes tracking data from a baseball game that defines the pitch and the angle. Accordingly, based on data-driven data 1046, content fill engine 912 selects and/or generates content asking user 734 whether they would like to bet on the style of pitches.

Gambling data 1048 may be received within metadata 738 from server 720 and may include data on one or more of current wagers, previous wagers, and predictive wagers. For example, gambling data 1048 may define preferences of the corresponding gambling institution (e.g., third-party 703), and content fill engine 912 may include and/or use the preferences in live content 740 for user 734 to evaluate. Using an American football game as an example, where the offensive line is moving forward in a first-quarter of the game and the gambling institution wants to incentivize more wagers, gambling data 1048 may cause content fill engine 912 to present a second-quarter prop bet (e.g., a wager on performance of a specific player, or a wager that a certain situation will occur) within live content 740. Accordingly, system 700 drives engagement of user 734, particularly when they have accepted the prop bet, to watch the second-quarter of the game, focusing on the specific player. Accordingly, gambling data 1048 causes content fill engine 912 to customize live content 740 based upon activity of user 734.

Inventory assets 1050 may be received within metadata 738 from server 720 or may be determined by interactive input engine 910 and included in dynamic characteristics 728. Inventory assets 1050 may include data on a wallet, credit card information, and payment structures of user 734. Content fill engine 912 may process inventory assets 1050 to determine spending habits of user 734 and thereby present content within live content 740 based on these spending habits. For example, where inventory assents 1050 indicates that user 734 has reached a personal limit in the amount of money wagered in any one day, content fill engine 912 may determine not to present user 734 with as many wagering options in live content 740. In another example, based on previously gathered live user patterns 1002 of user 734, content fill engine 912 may determine that user 734 is currently spending a lot, and therefore content fill engine 912 may include options within live content 740 to spend more or to spend less.

Content fill engine 912 uses one or more algorithms to process one or more of dynamic characteristics 728, third-party data 1044, data-driven data 1046, gambling data 1048, inventory asset 1050, and creator data 1056 to automatically select media streams 706, and other defined content (e.g., images, table, graphics, etc.) to generate full nodes 1062 of assigned content 1060. For example, where empty node 1038(2) is assigned to first virtual channel 214(1), content assigned to corresponding full node 1062(2) appears on display screen 204(1) in live content 740. Content fill engine 912 generates full nodes 1062 based upon a weighted calculation of creator data 1056 and dynamic characteristics 728. For each empty node 1038, content fill engine 912 uses a weighted calculation to determine which of the plurality of media streams 706 (and/or other media content) is to be assigned to that node to generate the corresponding full node 1062. For example, content fill engine 912 may perform a calculation similar to: media selection probability=weight * (creator data 1056 match to dynamic characteristics 728). Then, based on the determined media selection probability, content fill engine 912 uses the corresponding media stream 706 to generate full node 1062, such that content of the selected media stream 706 plays in the corresponding virtual channel 214. For example, where dynamic characteristics 728 indicate that user 734 bets on LeBron James more than on other athletes, content fill engine 912 assigns more media streams 706 that have content with LeBron James to generate full nodes 1062, and thus live content 740 is customized for user 734. In another example, when user 734 bets frequently on Russell Westbrook, content fill engine 912 automatically customizes live content 740 to include more wagering content, particularly wagering content related to Russell Westbrook, whereas when user 734 bets infrequently, but watches content including Russell Westbrook, content fill engine 912 automatically customizes live content 740 to include less wagering content and more media streams 706 that include content related to Russell Westbrook.

In one example of operation, interactive input engine 910 continuously collects dynamic characteristics 728 as user 734 interacts with client device 730, and provides dynamic characteristics 728 as input to content fill engine 912. Content player 732 receives, from server 720, live broadcast 722 containing metadata 738 with empty nodes 1038. Content player 732 generates and updates 3D model 736 based upon metadata 738 to create a base environment of virtual environment 725 as virtual newsroom including floors, walls, ceilings, and furniture. Content fill engine 912 processes metadata 738 and dynamic characteristics 728 with one or more of user patterns 1042, third-party data 1044, data-driven data 1046, gambling data 1048, inventory asset 1050, and creator data 1056 to automatically select media streams 706, and other defined content (e.g., images, table, graphics, etc.) to generate full nodes 1062 of assigned content 1060. Content player 732 then updates 3D model 736 based on assigned content 1060 and renders live content 740 from 3D model 736 based upon virtual camera 737. For example, where virtual environment 725 includes an LED wall display such that live content 740 shows a certain view of the live event 704 from a particular vantage point and angle, user 734 may select an alternative view point and angle to improve their view of a particular portion of the event. For example, where the event is a crime drama, user 734 may adjust the virtual camera to look closer at a note left for the detective.

Accessibility Customization

Advantageously, content fill engine 912 may also customize live content 740 to improve accessibility by user 734. For example, content fill engine 912 may select custom fonts and sizes used in text based graphic screens generated by content player 732. For example, where user 734 is visually impaired, content fill engine 912 may control content player 732 to generate screens showing wagers in a large font with a high contrast between the font and a background. In another example, where user 734 is visually impaired, content fill engine 912 may control content player 732 to generate audio that include a voice describing a prop bet. In another example, where user 734 is dyslexic, content fill engine 912 may control content player 732 to generate screens showing player profiles using a font specifically selected to aid dyslexic readers.

Figure 11A:
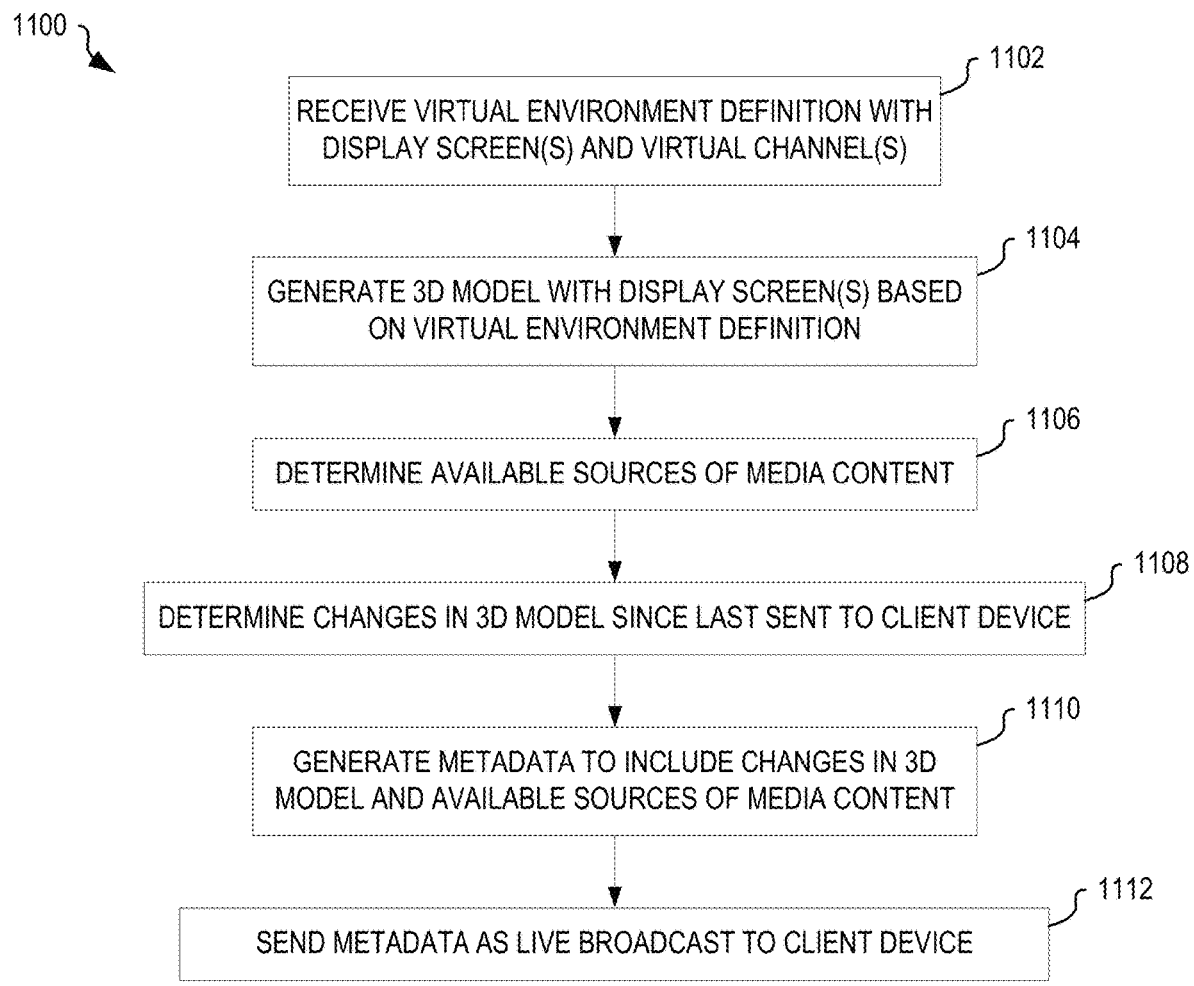
FIG. 11A is a flowchart illustrating one example method for creating and distributing interactive addressable virtual content, in embodiments.
Figure 11B:
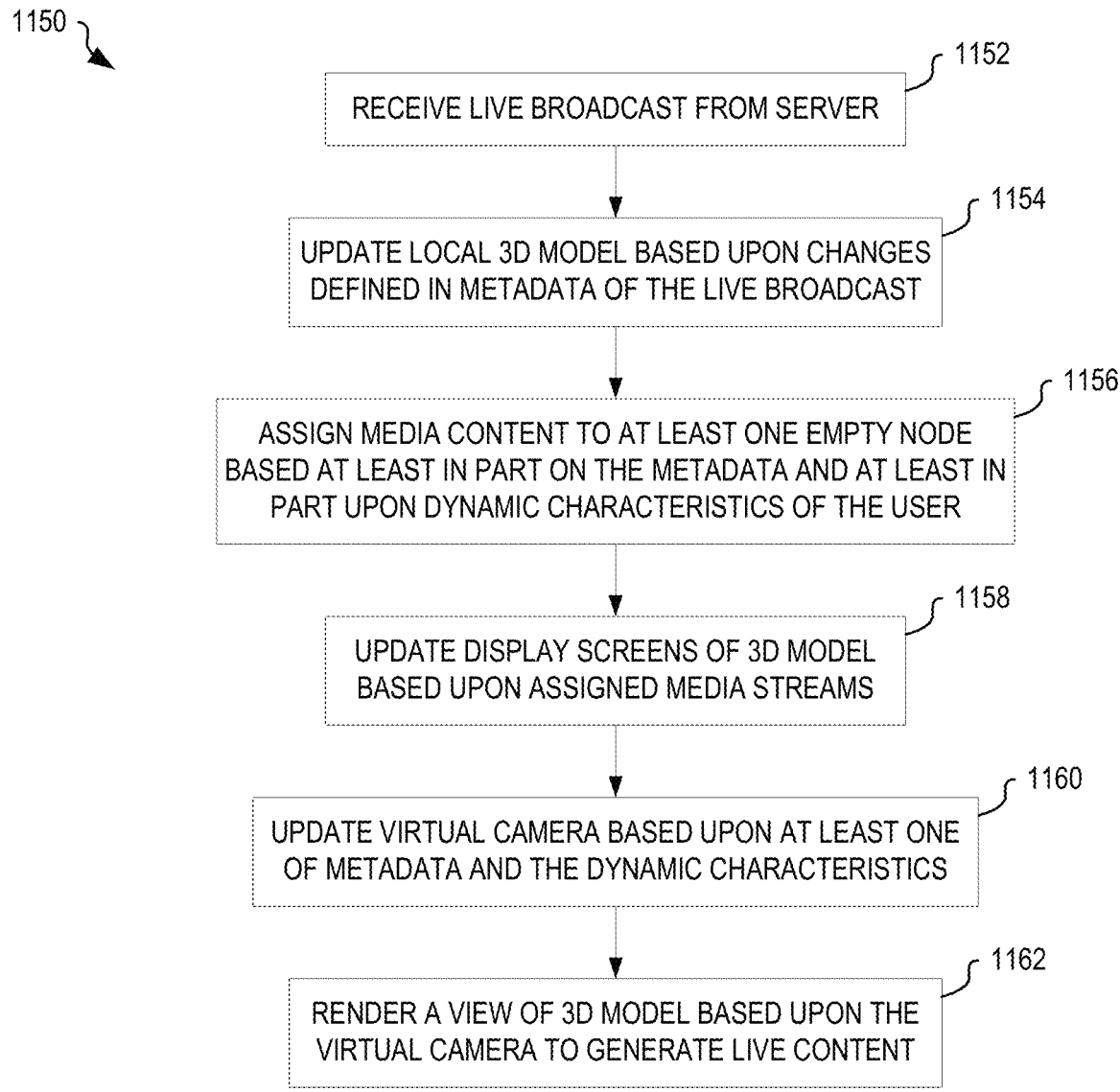
FIG. 11B is a flowchart illustrating one example method for displaying interactive addressable virtual content on a client device, in embodiments.

FIG. 11A is a flowchart illustrating one example method 1100 for creating and distributing addressable virtual content with interactivity. Method 1100 is implemented, at least in part, by producer application 726 of server 720, for example. FIG. 11B is a flowchart illustrating one example method 1150 for creation and distribution of addressable virtual content with interactivity. Method 1150 is implemented, at least in part, in content player 732 of client device 730, for example. FIGS. 11A and 11B are best viewed together with the following description.

In block 1102, method 1100 receives a virtual environment definition with at least one display screen and at least one corresponding virtual channel. In one example of block 1102, producer application 726 of server 720 receives broadcast parameters 712 from production controller device 710, where broadcast parameters 712 include model elements (e.g., see model elements 810 of FIG. 8) that define one or more structural components (e.g., static components 824, such as virtual desk 210, walls, ceiling, floor, lights, etc.), display screens 204 and corresponding virtual channels 214, avatar 220, virtual banner 212, and so on, of within 3D model 724 to represent virtual environment 725. In block 1104, method 1100 generates a 3D model with display screens based on the virtual environment definitions. In one example of block 1104, producer application 726 generates 3D model 724 with display screens 204, virtual desk 210, avatar 220, and virtual banner 212 to form virtual environment 725 (e.g., similar to virtual environment 125 shown in FIG. 2).

In block 1106, method 1100 determines available sources of media content. In one example of block 1106, media content manager 504 identifies Twitch/YouTube media streams 106(4), 106(8), 106(12), and 106(16) of FIG. 5 as available for use in a plurality of media streams 706 based upon receives a live broadcast from a server. In block 1108, method 1100 determines changes in 3D model since last sent to client device. In one example of block 1108, producer application 726 determines that the connection to client device 730 is new and determines that all of 3D model 724 is changed. In another example of block 1108, producer application 726 determines that 3D model 736 of client device 730 is up to date and that there are no changes to 3D model 724 that are not already known by client device 730. In another example of block 1108, producer application 726 determines that a position of avatar 220 within 3D model 736 has changed since the last update of 3D model 736 in client device 730.

In block 1110, method 1100 generates metadata to include changes in the 3D model and available sources of media content. In one example of block 1110, producer application 726 generates metadata 738 defining the identified changes in 3D model 724. Producer application 726 may also generate metadata 738 to include an address (e.g., URLs) of available media streams 706, and/or addresses of other available media content. Producer application 726 may also generate metadata 738 to include one or more of user patterns 1042, third-party data 1044, data-driven data 1046, gambling data 1048, inventory asset 1050, and creator data 1056 to enable content fill engine 912 of client device 730 to fill empty nodes 1038. In block 1112, method 1100 sends the metadata as a live broadcast to the client device. In one example of block 1112, producer application 726 includes metadata 738 in live broadcast 722 and sends live broadcast 722 to client device 730.

In block 1152, method 1150 receives the live broadcast from the server. In one example of block 1152, content player 732 receives live broadcast 722 from server 720. In block 1154, method 1150 updates the local 3D model based upon changes defined in metadata of the live broadcast. In one example of block 1154, content player 732 updates 3D model 736 based upon changes defined in metadata 738. In block 1156, method 1150 assigns media content to at least one empty node based at least in part on the metadata and at least in part upon the dynamic characteristics. In one example of block 1156, content fill engine 912 evaluates one or more of dynamic characteristics 728, third-party data 1044, data-driven data 1046, gambling data 1048, inventory asset 1050, and creator data 1056 to generate full nodes 1062 by assigning media streams 706 to empty nodes 1038. In block 1158, method 1150 updates the display screens of the 3D model based upon the assigned media streams. In one example of block 1158, content player 732 updates, via the corresponding virtual channel 214, display screens 204 using media streams 706 assigned to the corresponding full nodes 1062. In block 1160, method 1150 updates a virtual camera based upon at least one of the metadata and the dynamic characteristics. In one example of block 1160, virtual camera 737 is updates based upon metadata 738 and dynamic characteristics 728. In block 1162, method 1150 renders a view of the 3D model based upon the virtual camera to generate live content. In one example of block 1162, content player 732 renders at least part of 3D model 736, based upon the virtual camera 737, to generate one or more images that form live content 740.

Blocks 1152 through 1162 repeat such that 3D model 736 is updated in real-time based upon live event 704 (and movements of actor 708), and live content 740 is generated in real-time (i.e., with minimal latency), and such that live content 740 appears substantially instantaneous with live event 704 to user 734.

Playout Action

The 3D model in 736 may be used as a virtual element inside of another virtual model. This could be a new display or another feed. In certain embodiments, 3D models may become nested or embedded, such that a first 3D model 736 generated for a first event is embedded into a second 3D model 736 generated for a second event. As way of illustrating a need for displaying paid content, a website example if provided, where a user is required to view first content before being allowed to view second content. The user accesses the website to see desired content, but is forced to view a pre-roll video containing forced content (e.g., advertisement or other paid message) before the desired content is displayed by the website. A third-party may pay the website each time the "pre-roll" video and forced content is displayed to a user, and therefore it is in the interest of the web site owner to play the forced content to the user.

FIG. 12 shows an example screenshot 1200 of live content 740 at a first time (time A) and FIG. 13 shows an example screenshot 1300 of live content 740 at a second time (time B), later than the first time. FIGS. 12 and 13 are best viewed together with the following description. Unlike the website example described above, forced content and the desired content are displayed simultaneously, but audio of the forced content is played until it finishes. However, while the forced content is playing on a first display screen of virtual environment 725, a second display screen showing the desired content grows larger until it takes over whole virtual environment. In this example, content fill engine 912 mandates that the forced content be played, overriding directives of interactive input engine 910 that identifies preferred content. Particularly, content fill engine 912 controls behavior of virtual environment 725 within 3D model 736 to cause display of the forced content and the gradual transition to display of the desired content.

Screenshot 1200 shows a first element of content 1202 that is displayed smaller than a second element of content 1204. First element of content 1202 represents content that is desired or requested by user 734 and second element of content 1204 represents content that a paying third-party (e.g., a specific content provider, an advertiser, a bookmaker, etc.) wants user 734 to see. Initially, as shown in FIG. 12, second element of content 1204 is displayed larger, and is therefore more noticeable than, first element of content 1202.

Over the period between time A and time B, a sliding approach causes second element of content 1204 to reduce in size and first element of content 1202 to increase in size in a simultaneous smooth transition. Over a subsequent period, first element of content 1202 may take over the entire live content 740. In certain embodiments, content player 732 receives input from sensors of client device 730 that may indicate whether user 734 is attentive of not to live content 740, and client device 730 may adjust the period between time A and time B accordingly. Particularly, the transition between screenshot 1200 and screenshot 1300 may only occur when user 734 is attentive to live content 740. Accordingly, based upon the node sensing array the content presented to the consumer can scale proportionally over time to show them multiple views of the content.

Content fill engine 912 may control scaling of elements within 3D model 736 to present a sliding content appearance to user 734. Content fill engine 912 may determine the scaling and time period for the sliding playout based upon one or more inputs including third-party data 1044, creator data 1056, and/or dynamic characteristics 728. The playout action embeds content 1204 into the experience of live content 740. Advantageously, content fill engine 912 allows system 700 to display forced content (e.g., advertisements and/or paid messages) within the virtual environment, gradually and smoothly transitions between the forced content and the desired content within the same virtual environment, until the desired content dominate the virtual environment in a final stage.

Figure 14:
FIG. 14 shows one example screenshot, generated by the system of FIG. 7, showing the virtual environment representing a virtual stadium with virtual fan interaction via remote streams, in embodiments.

FIG. 14 shows one example screenshot 1400, generated by system 700 of FIG. 7, showing virtual environment 125 representing a virtual stadium 1402 with interaction by virtual fans 1404 via remote streams. In this example, a group of users corresponding to virtual fans 1404, form a "watch party" for a live event. System 700 generates 3D models 724/736 for the live event as virtual stadium 1402 with a plurality of empty nodes (e.g., empty nodes 1038) that each correspond to one display screen 204 at each spectator position in the virtual stadium 1402. Within each client device 730 of the group of users, content fill engine 912 connects to each other client device 730 to receive media stream 706, where each client device 730 also operates, at least in part, similar to content capturing/streaming device 702 to capture and stream video of the user to server 720. Content fill engine 912 fills the empty nodes 1038 in the 3D model 736 with the media streams 706, and generates virtual stadium 1402 populated with live images of the group of users forming a crowd participating at the live event. In the example of FIG. 14, 3D model 736 may also animate display screens 204 within 3D model 736, in response to activity at the live event. In the example of FIG. 14, display screens 204 are animated in reaction to an athlete 1406 leaping into the virtual crowd. Further, since each user is both watching the live event and appearing in the live event (as a spectator), their reaction to events in the live event is also reflects to other is the group of users. To facilitate configuration of such groups of users, interactive input engine 910, running of the client device 730, may notify the user of the live event and when the user elects to do so, creates an experience where the entire group of users watch and participate in the live event, and see special effects, for example like the "Lambeau Leap" shown in FIG. 14.

Figure 15:
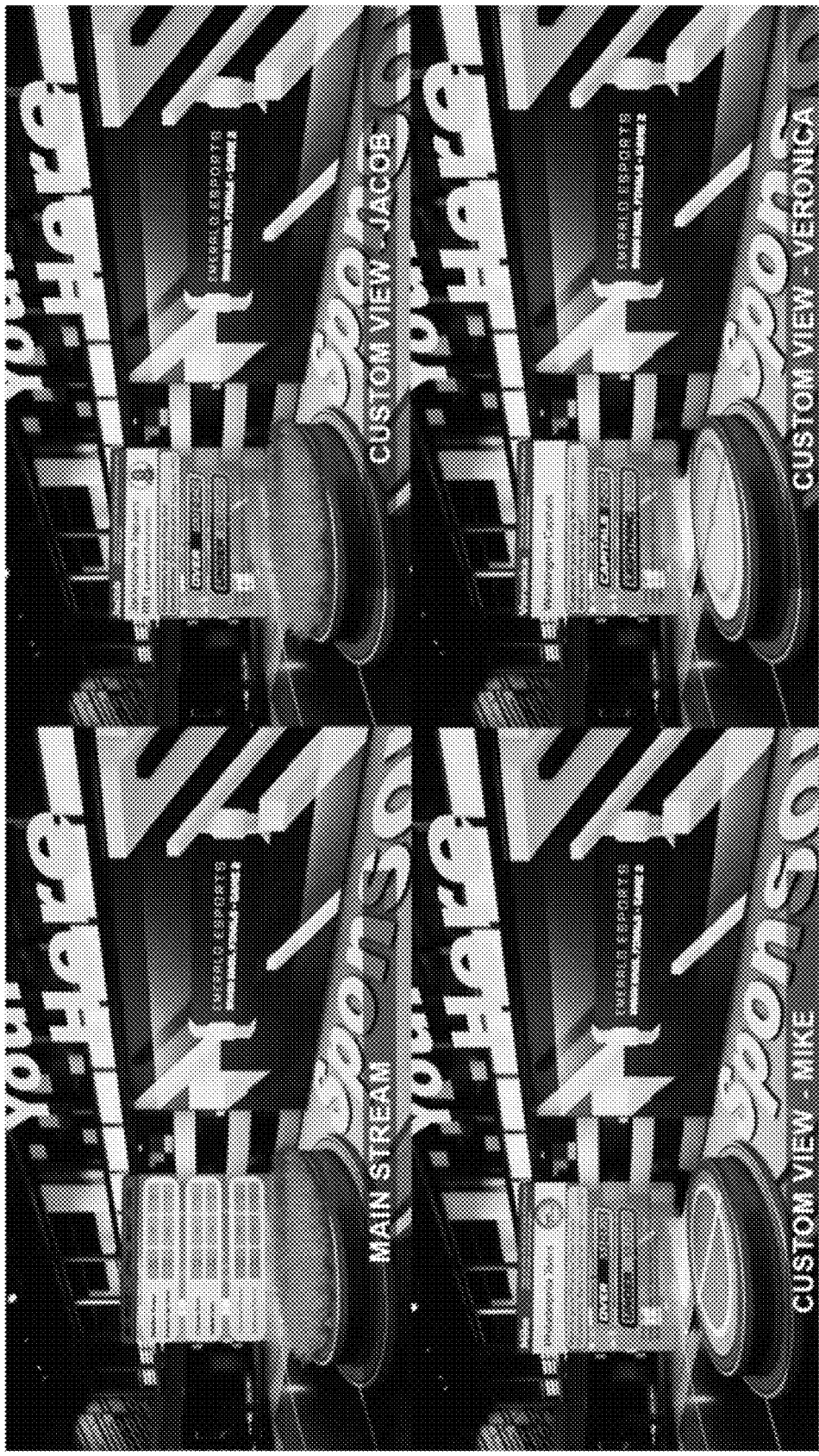
FIG. 15 shows four example live content screenshots simultaneously generated by the system of FIG. 7 for a single live event, illustrating customization for three different users, in embodiments.

FIG. 15 shows four example live content screenshots 1500, 1520, 1540, and 1560 simultaneously generated by system 700 of FIG. 7 for a single live event 704, illustrating customization for three different users 734. Screenshot 1500 is captured from live content 740 that is not customized by content fill engine 912, and may be output when a new user first connects with system 700 and has not defined sporting affiliations or preferences. Screenshot 1500 may show general (non-team specific) statistics that may be of interest to sporting fans.

Screenshot 1520 is generated in live content 740 and is specifically customized by content fill engine 912 for "Jacob," (user 734). As compared to screenshot 1500, Jacob's preferences and affiliations with the Jacksonville Jaguars, and particularly with running back Leonard Fournette, causes content fill engine 912 to select and include a wager based on Leonard Fournette on one or more virtual screens (e.g., display screen 204, FIG. 2) of virtual environment 725.

Screenshot 1540 is generated in live content 740 and is specifically customized by content fill engine 912 for "Mike," (another user 734). As compared to screenshot 1500, Mike's preferences and affiliations with the Philadelphia 76ers causes content fill engine 912 to select and include a wager based on the Philadelphia 76ers on one or more virtual screens (e.g., display screen 204, FIG. 2) of virtual environment 725.

Screenshot 1560 is generated in live content 740 and is specifically customized by content fill engine 912 for "Veronica," (another user 734). As compared to screenshot 1500, Veronica's preferences and affiliations with the Washington Capitals causes content fill engine 912 to select and include a wager based on the Washington Capitals on one or more virtual screens (e.g., display screen 204, FIG. 2) of virtual environment 725.

Content fill engine 912 generates customized content that more successfully engages the corresponding user 734 as compared to engagement with content shown in screenshot 1500 that is not customized.

Encouraging User Interaction

In overview, system 700 of FIG. 7 implements three main concepts. Live events are captured by content capturing/streaming devices 702, and under control of production controller 114, are output in live broadcasts 722 to multiple client devices 730. Unlike conventional media broadcasts where video frames are transmitted and then displayed without modification to a viewer, system 700 transmits metadata and changes to a server generated 3D model. The client device may then customize the content and generate the video (or other formats) for output to the user. On each client device 730, content player 732, based on live broadcast 722, customizes live content 740 to encourage user behavior. The encouraged user behavior may include one or more of betting, watching more content, and directing the user 734 to make an action.

In one example of operation, one or more content capturing/streaming devices 702 capture at least one media stream 706 of live event 704 that includes content of a popular athlete, such as LeBron James. For example, production controller 714 may use production controller device 710 to generate a headshot of the popular athlete as a graphic to be included in virtual environment 725. Producer application 726 may detect the popular athlete (e.g., using facial recognition, text analysis of a caption, and so on) and associate the name of the popular athlete with the graphical display within metadata 738 for output with live broadcast 722. Interactive input engine 910 captures dynamic characteristics 728 of user 734 that may indicate an interest in the popular athlete. In one example, content fill engine 912 may then use metadata 738 and dynamic characteristics 728 to customize live content 740 by adding a content window within live content 740 to encourage user 734 to place a bet on the popular athlete. In another example, where dynamic characteristics 728 indicate that user 734 has an interest in certain beverages endorsed by the popular athlete, content fill engine 912 may then use metadata 738 and dynamic characteristics 728 to customize live content 740 by adding a content window within live content 740 to encourage user 734 to purchase the beverage. Advantageously, content fill engine 912 fills empty nodes with customized content related to, and that may influence behavior of, user 734.

FIG. 16 is a schematic illustrating one example virtual environment 725 generated as a volumetric space formed by a plurality of display screens 204 defined by 3D model 724. FIG. 16 also shows avatar 220 to provide perspective to virtual environment 725. Particularly, virtual environment 725 defines a volumetric space that resembles a real studio and that provides a uniform look to live content 740, even after customization by content fill engine 912 for different users 734 on different client devices 730. In the example of FIG. 16, five display screens 204 form the ceiling, back wall, left wall, right wall, and floor of a studio. However, each content fill engine 912, running in different client devices 730, may generate different content for each display screen 204 based upon the provided metadata 738 and the determines dynamic characteristics 728 of the corresponding user 734. In one example, at least one display screen 204 is filled with a graphic image showing a particular logo (e.g., a logo of a sponsor of live event 704).

Figure 17:
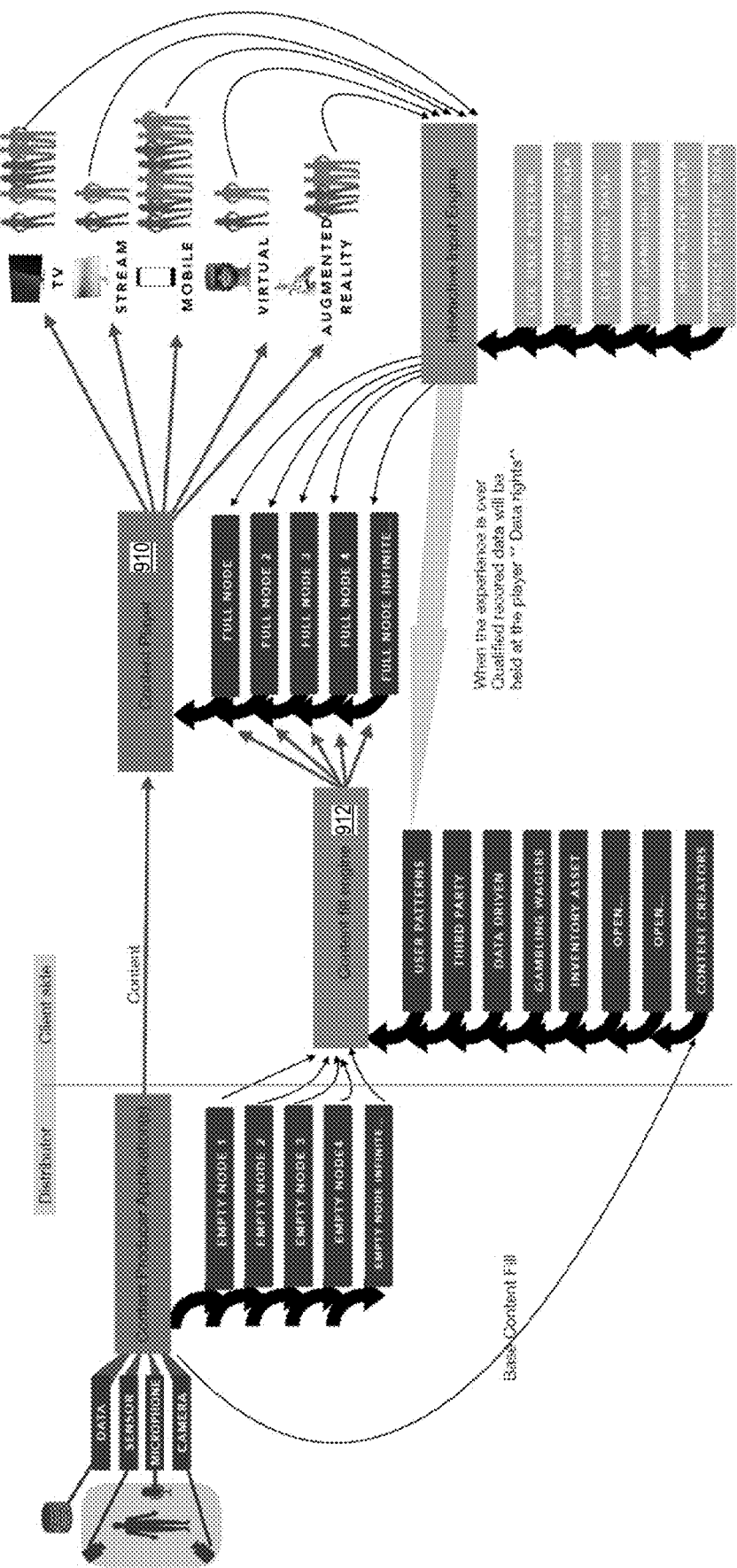
FIG. 17 is a schematic illustrating example node workflow performed by the interactive input engine and the content fill engine of the content player of FIG. 7, in embodiments.

FIG. 17 is a schematic illustrating example node workflow performed by interactive input engine 910 and content fill engine 912 of content player 732 of FIG. 7. FIG. 17 provides a high-level overview of the operation of system 700 to generate customized content for each user 734. The customized content engine fills in multi-dimensional content to be presented to a person or persons during the LIVE or recorded or re-experience of an event. An event consists of a start time and an end time where experience is processed in a manner as to provide enjoyment, instruction, recovery or any other experience that is designed for humans or artificial intelligence to visually, audibly, physical or mentally process. The custom content fill engine differs from ad replacement or content replacement as there is nothing in the default position for the content to be replaced. Instead, when content is created nodes are designated for content from the engine to be presented simultaneously with the viewer(s) experiencing the content. The nodes can increase or decrease based on the content consumed by the viewer or viewers depending on a variety of factors (Location, zip code, team affiliation, gambling practice, browsing practice, betting estimate, browsing estimate, or any other predictive analytical pattern process). The nodes take input from the Content Fill Engine from a variety of sources.

This content can be live or pre-produced and be anything from an advertisement, a bar chart from a stock presentation, an audio file, a graphic to prompt a wager, a volumetric view, a multi-dimensional model, a lesson plan, and or anything else where a message is viewed, listened, touched or presented. The core of the process is in these special fill nodes is a result of the input process. This is where the team creating the content or processing the content designates an initial number of nodes where content will be filled in. Content is designated with a volumetric diagram consisting of data, colors, patterns, and predictive measures. The nodes are not static, they can go up or down depending on the content consumption pattern of the viewer. This is controlled by an interactive input engine that links from the viewer via the player into the Content Fill Engine.

When the content is experienced the base number of nodes is processed with an algorithm that takes into effect the viewer(s) that are experiencing the content and presents to them material to fill in their experience. This happens in the content stream as opposed to a layer on top or below, it is within the presentation. Being in the presentation in a volumetric display and volumetric association provides a direct tie to the content story. Content flows in one way from the production and a separate way via the content fill engine, together they form the experience the viewer sees. Then the Interactive Input Engine feeds back into the Content Fill Engine to keep the content produced as interesting to the experiencer as possible.

The Content Fill Engine presents content from multiple inputs. User Patterns—it takes into effect users' patterns and desires through behaviors and through predictive analytics. Content Creators—it takes into effect decisions from the content creators who will designate affiliated content such as supporting material, suggestive next content to experience, audio to reference, gambling bets to make, fantasy sports predictions, opinion polls, election results, and any and all content related elements. Third-Party—it takes into effect elements from advertisers, marketers, educators, or anyone that leverages into the system to drive a message to the user. This can be done via a web URL, or an asset tracking or Consumer Marketing Tracker or Custom Asset Manager. Data-Driven—it takes into effect data from an event that is collected in the content process and provides that data is presented in the player to the viewer(s). This can be statistics around players on a person's fantasy teams. Gambling Wagers—it takes into effect data from current wagers and previous wagers and predictive wagers. Inventory assets—It takes into effect things like wallet and credit card info and payment structures.

Interactive Input Engine captures input about each user (content viewer). Live User patterns—it takes into effect the current patterns of the experiencer(s). What does a user watch and where are they spending their time? Biometric data—it takes into effect any biological input possible from the viewer(s). This can include and is not limited to optical feedback, audio tracking, image tracking, haptic feedback. Audio data—it takes into effect input from the audio of the content engine that will tell the Content Fill Engine the background audio that is listening to. Live Gambling data— it takes into effect where the bets are being made and for what values. Non-Active data—it takes into effect where the user is looking at items but not selecting them. This is when someone is on a page on a web browser and clicks to investigate a bet but does not place it. Device-specific data—This could be system tracking for example iPhone vs Android. This is also where they are clicking, this is also if they are watching in landscape or portrait mode and any element from hardware, software tracking possible.

All of the main inputs in the Content Fill Engine are brought in on a weighted scale. The scale varies based on the level of content consumed. The scale's objective is to have the viewer(s) consume content that is desired and to create transactions within the content relative to the content presented by the content engine and in relationship to the content from the content producers. In this way the inputs that create the experience move in concordance with the desired goal of increasing the consumption transaction rate to create repeatable patterns in content experiences that will evolve as the viewer(s) evolve. The two engines paired with the content create the experience that forms the player and keeps the loop continuing for the individual's experiencing the content.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for creation and distribution of addressable virtual content with interactivity, the system comprising:
   a server having:
   at least one first processor;
   a first memory communicatively coupled with the first processor and storing machine readable instructions that, when executed by the first processor, cause the first processor to:
      receive at least one media stream of a live event;
      generate a server 3D model defining a virtual environment that includes at least one display screen associated with a virtual channel;
      associate an empty node, representing a placeholder where content may be added, with the virtual channel;
      generate, within the server 3D model, an avatar representative of a person within the virtual environment;

animate, in real-time, the avatar within the server 3D model based upon movement data captured from an actor;

generate metadata to define only changes to the server 3D model, the empty node, and addresses for each of the at least one media stream; and send the metadata in a live broadcast to a client device; and a content player implemented as machine readable instructions downloadable into a second memory of the client device that, when executed by at least one second processor of the client device, causes the second processor to:

receive, within the client device, the live broadcast from the server;

decode, from the live broadcast, (a) the metadata defining only the changes to the server 3D model defining the virtual environment, (b) the empty node associated with the virtual channel of the display screen, and (c) the addresses for each of at least one media stream;

assign one of the at least one media streams to the empty node based on dynamic characteristics of a user detected by the client device;

update a local 3D model in the client device in real-time based on the metadata, the local 3D model defining the virtual environment similar to the server 3D model;

add, in real-time, media content from the media stream assigned to the empty node to the display screen in the local 3D model;

render a view of the local 3D model in real-time; and output the view of the local 3D model from the client device.

2. A method for creation and distribution of addressable virtual content with interactivity, comprising:

receiving, within a server, at least one media stream of a live event;

generating, within the server, a 3D model defining a virtual environment, the virtual environment including at least one display screen associated with at least one virtual channel;

interactively receiving an assignment of the media stream to the virtual channel;

adding, in real-time, media content from the media stream to the display screen in the 3D model based, at least in part, upon the assignment;

rendering a view of the 3D model in real time; and outputting the view of the 3D model in a live broadcast to a client device.

3. The method of claim 2, further comprising:

generating, within the 3D model, an avatar representative of a person within the virtual environment; and animating, in real-time, the avatar within the 3D model based upon movement data captured from an actor; and wherein the avatar appears within the view of the 3D model.

4. The method of claim 2, further comprising:

determining, at the server based on feedback from the client device, dynamic characteristics of a user of the client device;

updating the assignment of the media stream to the virtual channel based upon the dynamic characteristics; and wherein the live broadcast is automatically customized for the user based on habits and desires of the user captured in the dynamic characteristics based on behavior of the user.

5. The method of claim 2, further comprising presenting, to a production controller, a graphical user interface with at least one tab and at least one pull-down control that enables the production controller to select the media stream from a plurality of different media streams.

6. The method of claim 2, the 3D model defining a volumetric space that resembles at least one of newsroom, a classroom, a conference room, a sports studio, a stage, a poker table, a studio LED wall or enclose, and a virtual dungeon.

7. A method for creation and distribution of addressable virtual content with interactivity and low-latency, comprising:

receiving, within a server, at least one media stream of a live event;

generating, within a server, a 3D model defining a virtual environment that includes a display screen associated with a virtual channel;

associating an empty node, representing a placeholder where content may be added, with the virtual channel;

generating metadata to define only changes to the 3D model, the empty node, and addresses for each of the at least one media stream;

sending the metadata in a live broadcast to a client device; and wherein the live broadcast causes a content player running on the client device to generate a local 3D model based upon the metadata, assign at least one of the media streams to the empty node, add, in real-time, media content from one of the media streams to the display screen in the local 3D model based on an assignment of the media stream to the empty node of the virtual channel.

8. The method of claim 7, further comprising:

generating, within the 3D model, an avatar representative of a person within the virtual environment; and animating, in real-time, the avatar within the 3D model based upon movement data captured from an actor.

9. The method of claim 7, the generating the metadata further comprising generating the metadata to include a wagering opportunity received from a third-party server and an address of the third-party server, wherein the live broadcast causes the content player running on the client device to include the wagering opportunity in the local 3D model.

10. A method for creation and distribution of addressable virtual content with interactivity and low-latency, comprising:

receiving, within a client device, a live broadcast from a server;

decoding, from the live broadcast, (a) metadata defining only changes to a server 3D model defining a virtual environment, (b) an empty node associated with a virtual channel of a display screen in the virtual environment, and (c) an address of each of at least one media stream captured from a live event;

assigning one of the at least one media streams to the empty node based on dynamic characteristics of a user detected by the client device;

updating a local 3D model in real-time based on the metadata to represent the virtual environment including a local display screen that represents the display screen;

adding, in real-time, media content from the media stream assigned to the empty node to the local display screen;

rendering a view of the local 3D model in real-time;

outputting the view of the local 3D model from the client device; and wherein the view of the local 3D model shows content from the media stream displayed on the display screen within the virtual environment with low-latency.

11. The method of claim 10, further comprising animating, in real-time, an avatar within the local 3D model based upon movement data received from the server.

12. The method of claim 10, the display screen in the local 3D model having a first size, the method further comprising updating the local 3D model to include a dynamic display screen having a second size and including a message from a third-party, the second size being greater than the first size at a first time and the first size being greater than the second size at a second time later than the first time.

13. The method of claim 12, the first size and the second size changing smoothly during a period between the first time and the second time.

14. The method of claim 10, the step of assigning one of the at least one media streams to the empty node comprising assigning one of the at least one media streams to the empty node when the dynamic characteristics indicate a preferred interest in content of the at least one media stream.

15. The method of claim 14, wherein the preferred interest indicates one or more of a sports team, an athlete, and a product and wherein the metadata defines the content as including one or more of the sports team, the athlete, and the product.

16. The method of claim 10, the step of assigning one of the at least one media streams to the empty node comprising using artificial intelligence to learn, from the dynamic characteristics, preferences, and habits of the user.

* * * * *